US008254463B2

(12) United States Patent
Ikeda et al.

(10) Patent No.: US 8,254,463 B2
(45) Date of Patent: Aug. 28, 2012

(54) SELECTION OF ENCODED DATA, SETTING OF ENCODED DATA, CREATION OF RECODED DATA, AND RECODING METHOD AND DEVICE

(75) Inventors: Toshiyuki Ikeda, Tokyo (JP); Keiichi Chono, Tokyo (JP)

(73) Assignee: NEC Corporation, Tokyo (JP)

( * ) Notice: Subject to any disclaimer, the term of this patent is extended or adjusted under 35 U.S.C. 154(b) by 1585 days.

(21) Appl. No.: 11/645,977

(22) Filed: Dec. 26, 2006

(65) Prior Publication Data

US 2007/0147503 A1    Jun. 28, 2007

(30) Foreign Application Priority Data

Dec. 27, 2005    (JP) ................................. 2005-375404

(51) Int. Cl.
*H04N 7/12*    (2006.01)

(52) U.S. Cl. .............................. 375/240.24; 375/240.12

(58) Field of Classification Search .................. 375/240, 375/240.01, 240.03, 240.12, 240.24, 240.25; 382/243
See application file for complete search history.

(56) References Cited

U.S. PATENT DOCUMENTS

| 6,307,976 | B1* | 10/2001 | Chun et al. ................... 382/243 |
| 7,822,117 | B1* | 10/2010 | Linzer et al. ............. 375/240.03 |
| 2002/0181595 | A1 | 12/2002 | Obata et al. |
| 2005/0100092 | A1 | 5/2005 | Sekiguchi et al. |
| 2005/0147163 | A1 | 7/2005 | Li et al. |

FOREIGN PATENT DOCUMENTS

| EP | 1 069 779 A1 | 1/2001 |
| EP | 1 515 564 A2 | 3/2005 |
| EP | 1 607 909 A1 | 12/2005 |
| JP | 2002-016913 | 1/2002 |
| WO | WO 98/19460 | 5/1998 |
| WO | WO 03/067778 A1 | 8/2003 |
| WO | WO 2004/080050 A2 | 9/2004 |

OTHER PUBLICATIONS

Japanese Official Action dated Jul. 23, 2010 together with an English language translation.
"SMPTE 319M-2000" (authenticated by SMPTE on Jan. 20, 2000.
"SMPTE 327M-2000" (authenticated by SMPTE on Jan. 20, 2000.
Canadian Office Action dated Jan. 19, 2011.

* cited by examiner

*Primary Examiner* — Allen Wong
(74) *Attorney, Agent, or Firm* — Scully, Scott, Murphy & Presser, P.C.

(57) ABSTRACT

In macroblocks to which a prediction mode determination step, which determines whether or not a prediction mode applied to the macroblocks is a predetermined prediction mode, and an encoded data selection step, which selects a predetermined type of encoded data corresponding to the pixels at predetermined positions in the macroblocks to which the predetermined prediction mode is applied, are applied, there is provided a bit distribution step for more preferentially distributing bits to a predetermined type of encoded data selected at the encoded data selection step than a predetermined type of encoded data that is not selected at the encoded data selection step in the macroblocks to which the predetermined prediction mode is applied. With these steps, it is possible to provide an encoded data selection method which can limit the encoded data per one macroblock transmitted from a decoding device to a recoding device to less than a predetermined value while suppressing the lack ratio of the amount of information of the encoded data as much as possible.

54 Claims, 17 Drawing Sheets

FIG.3

| | intra | inter 16×16 f/b | inter 16×16 bi | inter 16×8 or 8×16 f/b + f/b | inter 16×8 or 8×16 f/b + bi | inter 16×8 or 8×16 bi + bi | Tree P-pic | All of Tree B-pic: f/b | Tree B-pic: 3 blocks; f/b, 1 block; bi | Tree B-pic: 2 blocks; f/b, 2 blocks; bi | Tree B-pic: 1 block; f/b, 3 blocks; bi | All of Tree B-pic: bi |
|---|---|---|---|---|---|---|---|---|---|---|---|---|
| MAXIMUM NUMBER OF SETS OF MV (H+V) | | 1 | 2 | 2 | 3 | 4 | 16 | 16 | 20 | 24 | 28 | 32 |
| NUMBER OF Ref idx | | 1 | 2 | 2 | 3 | 4 | 4 | 4 | 5 | 6 | 7 | 8 |
| NUMBER OF BLOCKS WITH 8×8 PREDICTED IN BIDIRECTION | | – | – | | | 1 | – | | 1 | 2 | 3 | 4 |
| mb_skip_flag | 1 | 1 | 1 | 1 | 1 | 1 | 1 | 1 | 1 | 1 | 1 | 1 |
| mb_field_flag | 1 | 1 | 1 | 1 | 1 | 1 | 1 | 1 | 1 | 1 | 1 | 1 |
| mb_type | 6 | 6 | 6 | 6 | 6 | 6 | 6 | 6 | 6 | 6 | 6 | 6 |
| sub_mb_type[4] | 0 | 0 | 0 | 0 | 0 | 0 | 16 | 16 | 16 | 16 | 16 | 16 |
| ref_idx[2][4] | 0 | 5 | 10 | 10 | 15 | 20 | 20 | 20 | 25 | 30 | 35 | 40 |
| mv[2][16][H] | 0 | 14 | 28 | 28 | 42 | 56 | 224 | 224 | 280 | 336 | 392 | 448 |
| mv[2][16][V] | 0 | 12 | 24 | 24 | 36 | 48 | 192 | 192 | 240 | 288 | 336 | 384 |
| qp | 6 | 6 | 6 | 6 | 6 | 6 | 6 | 6 | 6 | 6 | 6 | 6 |
| intra_lumaNxN_pred_dir[16] | 64 | 0 | 0 | 0 | 0 | 0 | 0 | 0 | 0 | 0 | 0 | 0 |
| intra_chroma_pred_dir | 2 | 0 | 0 | 0 | 0 | 0 | 0 | 0 | 0 | 0 | 0 | 0 |
| cbp | 6 | 6 | 6 | 6 | 6 | 6 | 6 | 6 | 6 | 6 | 6 | 6 |
| transform_size_8×8 | 1 | 1 | 1 | 1 | 1 | 1 | 1 | 1 | 1 | 1 | 1 | 1 |
| TOTAL | 87 | 52 | 83 | 83 | 114 | 145 | 473 | 473 | 582 | 691 | 800 | 909 | f:forward, b:backward, bi:bi-predicion

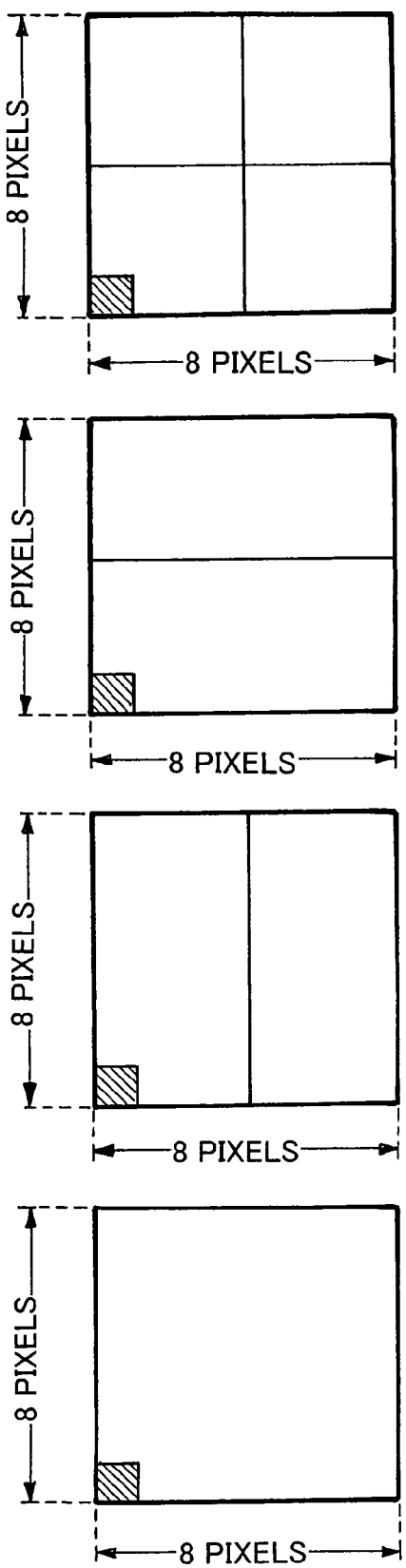

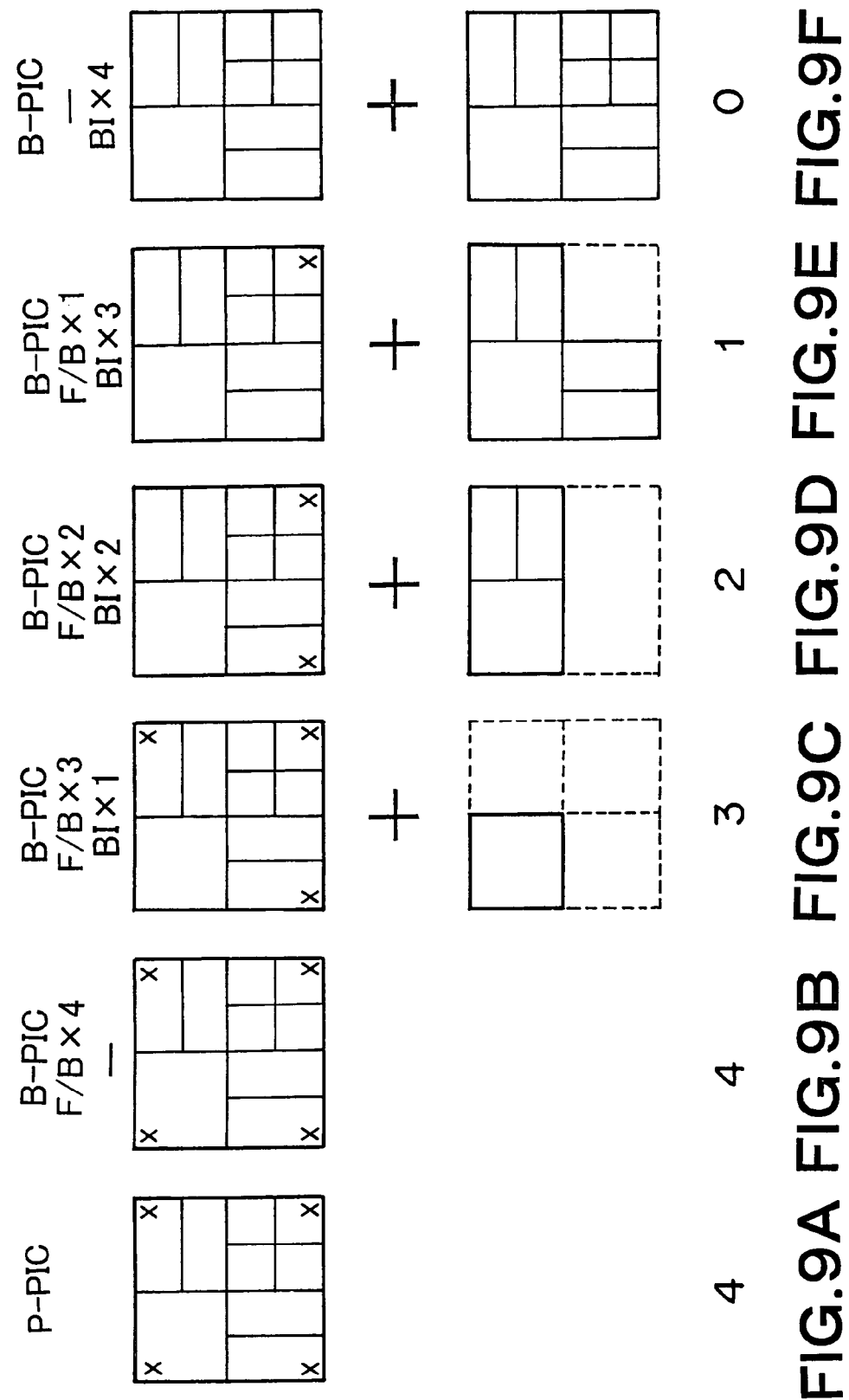

FIG.10

| PICTURE TYPE TO WHICH MACROBLOCK BELONGS | NUMBER OF SUB-MACROBLOCKS OF EACH PREDICTION MODE | PREDICTION MODE OF THE SUB-MACROBLOCK | THE SECONDARY SUBMACROBLOCK INCLUDES/NOT INCLUDES PARTICULAR PIXEL POSITION | SELECTION | REMARKS | NUMBER |
|---|---|---|---|---|---|---|
| P PICTURE | FORWARD DIRECTION × 4 | ONE DIRECTION | INCLUDED | YES | IN 8 PIXELS, THAT IS ALL | (a)-1 |
| | | | NOT INCLUDED | NO | | (a)-2 |
| | FORWARD DIRECTION/BACKWARD DIRECTION × 4 BIDIRECTION × 0 | ONE DIRECTION (FORWARD DIRECTION/BACKWARD DIRECTION) | INCLUDED | YES | IN 8 PIXELS, THAT IS ALL | (b)-1 |
| | | | NOT INCLUDED | NO | | (b)-2 |
| | FORWARD DIRECTION/BACKWARD DIRECTION × 3 BIDIRECTION × 1 | ONE DIRECTION (FORWARD DIRECTION/BACKWARD DIRECTION) | INCLUDED | YES | IN 8 PIXELS, THAT IS ALL | (c)-1 |
| | | | NOT INCLUDED | NO | | (c)-2 |
| | | BIDIRECTION | INCLUDED/NOT INCLUDED | NO | | (c)-3 |
| B PICTURE | FORWARD DIRECTION/BACKWARD DIRECTION × 2 BIDIRECTION × 2 | ONE DIRECTION (FORWARD DIRECTION/BACKWARD DIRECTION) | INCLUDED | YES | IN 8 PIXELS, THAT IS ALL | (d)-1 |
| | | | NOT INCLUDED | NO | | (d)-2 |
| | | BIDIRECTION | INCLUDED/NOT INCLUDED | NO | | (d)-3 |
| | FORWARD DIRECTION/BACKWARD DIRECTION × 1 BIDIRECTION × 3 | ONE DIRECTION (FORWARD DIRECTION/BACKWARD DIRECTION) | INCLUDED | YES | IN 8 PIXELS, THAT IS ALL | (e)-1 |
| | | | NOT INCLUDED | NO | | (e)-2 |
| | | BIDIRECTION | INCLUDED/NOT INCLUDED | NO | | (e)-3 |
| | FORWARD DIRECTION/BACKWARD DIRECTION × 0 BIDIRECTION × 4 | BIDIRECTION | INCLUDED/NOT INCLUDED | NO | | (f) |

FIG.11

| | intra | inter 16×16 f/b | inter 16×16 bi | inter 16×8 or 8×16 f/b + f/b | inter 16×8 or 8×16 f/b + bi | inter 16×8 or 8×16 bi + bi | Tree P-pic | All of Tree B-pic: f/b | Tree B-pic: 3 blocks; f/b, 1 block; bi | Tree B-pic: 2 blocks; f/b, 2 blocks; bi | Tree B-pic: 1 block; f/b, 3 blocks; bi | All of Tree B-pic: bi |
|---|---|---|---|---|---|---|---|---|---|---|---|---|
| MAXIMUM NUMBER OF SETS OF MV (H+V) | | 1 | 2 | 2 | 3 | 4 | 4 | 4 | 3 | 2 | 1 | 0 |
| NUMBER OF Ref idx | | 1 | | 2 | 3 | 4 | 4 | 4 | 5 | 6 | 7 | 8 |
| NUMBER OF BLOCKS WITH 8×8 PREDICTED IN BIDIRECTION | − | − | − | − | − | − | 0 | 0 | 1 | 2 | 3 | 4 |
| mb_skip_flag | 1 | 1 | 1 | 1 | 1 | 1 | 1 | 1 | 1 | 1 | 1 | 1 |
| mb_field_flag | 1 | 1 | 1 | 1 | 1 | 1 | 1 | 1 | 1 | 1 | 1 | 1 |
| mb_type | 6 | 6 | 6 | 6 | 6 | 6 | 6 | 6 | 6 | 6 | 6 | 6 |
| sub_mb_type[4] | 0 | 0 | 0 | 0 | 0 | 0 | 0 | 16 | 16 | 16 | 16 | 16 |
| ref_idx[2][4] | 0 | 5 | 10 | 10 | 15 | 20 | 20 | 20 | 25 | 30 | 35 | 40 |
| mv[2][16][H] | 0 | 14 | 28 | 28 | 42 | 56 | 56 | 56 | 42 | 28 | 14 | 0 |
| mv[2][16][V] | 0 | 12 | 24 | 24 | 36 | 48 | 48 | 48 | 36 | 24 | 12 | 0 |
| qp | 6 | 6 | 6 | 6 | 6 | 6 | 6 | 6 | 6 | 6 | 6 | 6 |
| intra_lumaNxN_pred_dir[16] | 64 | 0 | 0 | 0 | 0 | 0 | 0 | 0 | 0 | 0 | 0 | 0 |
| intra_chroma_pred_dir | 2 | 0 | 0 | 0 | 0 | 0 | 0 | 0 | 0 | 0 | 0 | 0 |
| cbp | 6 | 6 | 6 | 6 | 6 | 6 | 6 | 6 | 6 | 6 | 6 | 6 |
| transform_size_8×8 | 1 | 1 | 1 | 1 | 1 | 1 | 1 | 1 | 1 | 1 | 1 | 1 |
| TOTAL | 87 | 52 | 83 | 83 | 114 | 145 | 161 | 161 | 140 | 119 | 98 | 77 | f:forward, b:backward, bi:bi-predicion

MAXIMUM 161 bit

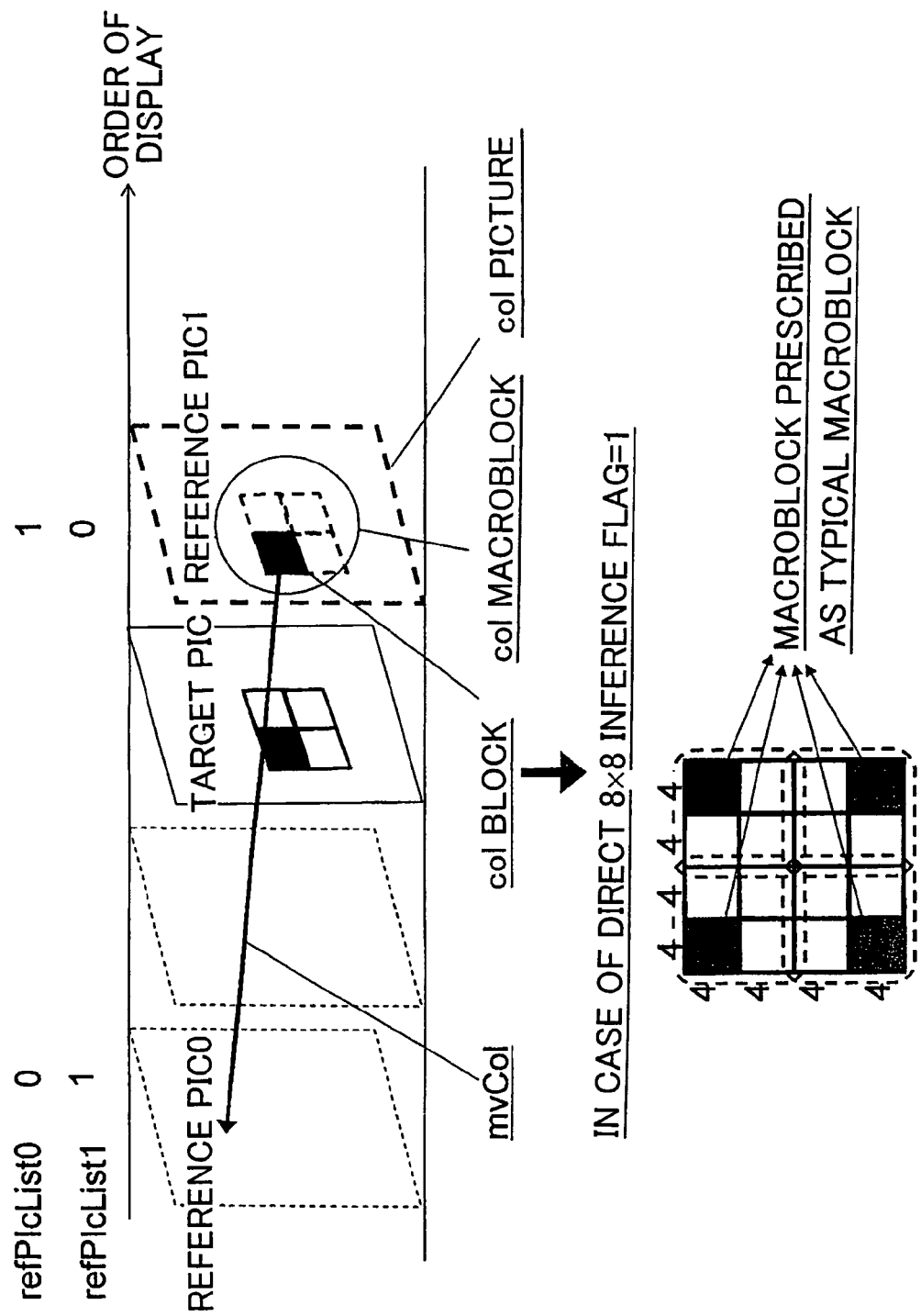

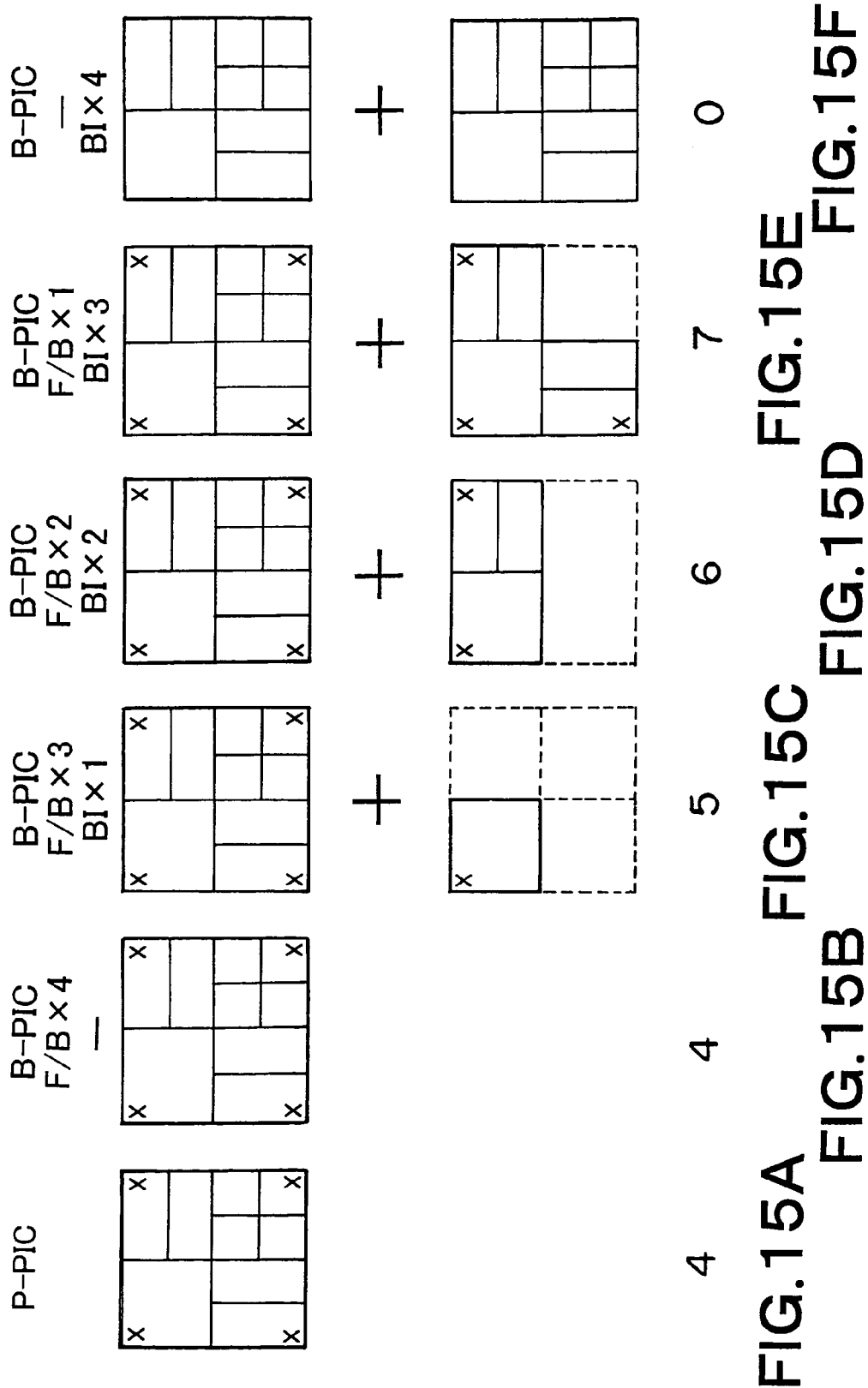

FIG. 16

| PICTURE TYPE TO WHICH MACROBLOCK BELONGS | NUMBER OF SUB-MACROBLOCKS OF EACH PREDICTION MODE | PREDICTION MODE OF THE SUB-MACROBLOCK | THE SECONDARY SUBMACROBLOCK INCLUDES/NOT INCLUDES PARTICULAR PIXEL POSITION | SELECTION | REMARKS | NUMBER |
|---|---|---|---|---|---|---|
| P PICTURE | FORWARD DIRECTION × 4 | ONE DIRECTION | INCLUDED | YES | IN 8 PIXELS, THAT IS ALL | (a)-1 |
|  |  |  | NOT INCLUDED | NO |  | (a)-2 |
| B PICTURE | FORWARD DIRECTION/BACKWARD DIRECTION × 4 BIDIRECTION × 0 | ONE DIRECTION (FORWARD DIRECTION/BACKWARD DIRECTION) | INCLUDED | YES | IN 8 PIXELS, THAT IS ALL | (b)-1 |
|  |  |  | NOT INCLUDED | NO |  | (b)-2 |
|  | FORWARD DIRECTION/BACKWARD DIRECTION × 3 BIDIRECTION × 1 | ONE DIRECTION (FORWARD DIRECTION/BACKWARD DIRECTION) | INCLUDED | YES | IN 8 PIXELS, THAT IS ALL | (c)-1 |
|  |  |  | NOT INCLUDED | NO |  | (c)-2 |
|  |  | BIDIRECTION | INCLUDED | YES | IN 8 PIXELS, THAT IS ALL | (c)-3-1 |
|  |  |  | NOT INCLUDED | NO |  | (c)-3-2 |
|  | FORWARD DIRECTION/BACKWARD DIRECTION × 2 BIDIRECTION × 2 | ONE DIRECTION (FORWARD DIRECTION/BACKWARD DIRECTION) | INCLUDED | YES | IN 8 PIXELS, THAT IS ALL | (d)-1 |
|  |  |  | NOT INCLUDED | NO |  | (d)-2 |
|  |  | BIDIRECTION | INCLUDED | YES | IN 8 PIXELS, THAT IS ALL | (d)-3-1 |
|  |  |  | NOT INCLUDED | NO |  | (d)-3-2 |
|  | FORWARD DIRECTION/BACKWARD DIRECTION × 1 BIDIRECTION × 3 | ONE DIRECTION (FORWARD DIRECTION/BACKWARD DIRECTION) | INCLUDED | YES | IN 8 PIXELS, THAT IS ALL | (e)-1 |
|  |  |  | NOT INCLUDED | NO |  | (e)-2 |
|  |  | BIDIRECTION | INCLUDED | YES | IN 8 PIXELS, THAT IS AL | (e)-3-1 |
|  |  |  | NOT INCLUDED | NO |  | (e)-3-2 |
|  | FORWARD DIRECTION/BACKWARD DIRECTION × 0 BIDIRECTION × 4 | BIDIRECTION | INCLUDED/ NOT INCLUDED | NO |  | (f) |

FIG.17

| | intra | inter 16×16 f/b | inter 16×16 bi | inter 16×8 or 8×16 f/b+f/b | inter 16×8 or 8×16 f/b+bi | inter 16×8 or 8×16 bi+bi | Tree P-pic | All of Tree B-pic f/b | Tree B-pic: 3 blocks; f/b, 1 block; bi | Tree B-pic: 2 blocks; f/b, 2 blocks; bi | Tree B-pic: 1 block; f/b, 3 blocks; bi | All of Tree B-pic: bi |
|---|---|---|---|---|---|---|---|---|---|---|---|---|
| MAXIMUM NUMBER OF SETS OF MV (H+V) | | 1 | 1 | 2 | 2 | 3 | 4 | 4 | 5 | 6 | 7 | 0 |
| NUMBER OF Ref idx | | 1 | 2 | 2 | 3 | 4 | 4 | 4 | 5 | 6 | 7 | 8 |
| NUMBER OF BLOCKS WITH 8×8 PREDICTED IN BIDIRECTION | | — | — | — | — | — | 0 | 0 | 1 | 2 | 3 | 4 |
| mb_skip_flag | 1 | 1 | 1 | 1 | 1 | 1 | 1 | 1 | 1 | 1 | 1 | 1 |
| mb_field_flag | 1 | 1 | 1 | 1 | 1 | 1 | 1 | 1 | 1 | 1 | 1 | 1 |
| mb_type | 6 | 6 | 6 | 6 | 6 | 6 | 6 | 6 | 6 | 6 | 6 | 6 |
| sub_mb_type[4] | 0 | 0 | 0 | 0 | 0 | 0 | 0 | 0 | 16 | 16 | 16 | 16 |
| ref_idx[2][4] | 0 | 5 | 10 | 10 | 15 | 20 | 20 | 20 | 25 | 30 | 35 | 40 |
| mv[2][16][H] | 0 | 14 | 28 | 28 | 42 | 56 | 56 | 56 | 70 | 84 | 98 | 0 |
| mv[2][16][V] | 0 | 12 | 24 | 24 | 36 | 48 | 48 | 48 | 60 | 72 | 84 | 0 |
| qp | 6 | 6 | 6 | 6 | 6 | 6 | 6 | 6 | 6 | 6 | 6 | 6 |
| intra_lumaN×N_pred_dir[16] | 64 | 0 | 0 | 0 | 0 | 0 | 0 | 0 | 0 | 0 | 0 | 0 |
| intra_chroma_pred_dir | 2 | 0 | 0 | 0 | 0 | 0 | 0 | 0 | 0 | 0 | 0 | 0 |
| cbp | 6 | 6 | 6 | 6 | 6 | 6 | 6 | 6 | 6 | 6 | 6 | 6 |
| transform_size_8×8 | 1 | 1 | 1 | 1 | 1 | 1 | 1 | 1 | 1 | 1 | 1 | 1 |
| TOTAL | 87 | 52 | 83 | 83 | 114 | 145 | 161 | 161 | 192 | 223 | 254 | 77 | f:forward, b:backward, bi:bi-predicion

MAXIMUM 254 bit

SELECTION OF ENCODED DATA, SETTING OF ENCODED DATA, CREATION OF RECODED DATA, AND RECODING METHOD AND DEVICE

BACKGROUND OF THE INVENTION

1. Field of the Invention

The present invention relates to an encoded data selection method and an encoded data setting method corresponding to the above method as well as to devices of these methods. Further, the present invention relates to a recoded data creation method including an encoded data selection method and a device corresponding to the method. Further, the present invention relates to a recoding method including an encoded data setting method and a device corresponding to the method. For example, the encoded data selection method is a method of selecting a part of encoded data output from a decoding device.

2. Description of the Related Art

In an tandem-connected MPEG-2 recoding device that uses a decoded image of MPEG-2 bit stream output from an MPEG-2 decoding device as an input, there is a technology for transmitting encoded data in a bit stream after it is multiplexed to decoded image (refer to "SMPTE 319M-2000" (authenticated by SMPTE on Jan. 20, 2000)).

In the MPEG-2 recoding device that supports SMPTE 319M-2000 Standard, encoded data multiplexed to decoded data is separated therefrom and recoding is carried out making use of the separated encoded data, thereby deterioration of image quality caused by recoding can be suppressed as much as possible. Encoded data referred to here is data obtained by returning code word, which is subjected to variable length coding in a bit stream, to an original numerical value.

In SMPTE 319M-2000 Standard, since it is standardized to superimpose the encoded data to LSB of chrominance of input decoded image, encoded data of 256 bits can be transmitted by an image of one macroblock.

Referring to Table 2 of "SMPTE 327M-2000" (authenticated by SMPTE on Jan. 20, 2000) that is MPEG-2 encoded data standard, since encoded data per one macroblock of MPEG-2 is 113 bits, it can be sufficiently transmitted in a band of 256 bits per one macroblock.

Recently, attention is paid to H.264 (ISO/IEC 14496-10). There is a case in which it is required to transform H.264 bit stream encoded by a certain bit rate to H.264 bit stream having a desired bit rate or to MPEG-2 bit stream having a desired bit rate. To cope with this case, it is necessary to connect an H.264 decoding device to an H.264 recoding device or an MPEG-2 recoding device in tandem and to transmit decoded image of H.264 bit stream therebetween. Further, to suppress deterioration of image quality as much as possible, it is necessary to transmit encoded data after it is multiplexed to decoded image of an H.264 bit stream likewise SMPTE 319-2000.

Incidentally, the encoded data of H.264 per one macroblock is different depending on a coding mode of the macroblock.

The coding mode is classified to an intra-mode of in picture coding and an inter-mode of inter picture coding.

Further, the macroblock has a size of 16×16, and as shown FIGS. 1A to 1D, the macroblock is classified to four types in the inter-mode. As shown in FIG. 1A, in a first macroblock type, one macroblock is composed of one submacroblock of 16×16 pixels. As shown in FIG. 1B, in a second macroblock type, one macroblock is composed of two submacroblocks of 16×8 pixels. As shown in FIG. 1C, in a third macroblock type, one macroblock is composed of two submacroblocks of 8×16 pixels. As shown in FIG. 1D, in a fourth macroblock type, one macroblock is composed of four submacroblocks with 8×8 pixels.

Further, the respective submacroblocks in the four macro types are classified to four kinds of types. As shown in FIG. 2A, in a first submacroblock type, one submacroblock is composed of one secondary submacroblock with 8×8 pixels. As shown in FIG. 2B, in a second submacroblock type, one submacroblock is composed of two secondary submacroblocks of 8×4 pixels. As shown in FIG. 2C, in a third submacroblock type, one submacroblock is composed of two secondary submacroblocks of 4×8 pixels. As shown in FIG. 2D, in a fourth submacroblock type, one submacroblock is composed of four secondary submacroblocks of 4×4 pixels.

As shown in FIG. 1A, in the first macroblock type, one submacroblock of 16×16 pixels included in one macroblock is subjected to forward prediction (F), backward prediction (B), or bidirectional prediction (BI). Further, one submacroblock has one motion vector in one direction. Thus, one submacroblock has one or two motion vectors.

As shown in FIG. 1B, in the second macroblock type, the two submacroblocks of 16×8 pixels included in one macroblock is subjected to forward prediction, backward prediction, or bidirectional prediction, respectively. Further, one submacroblock has one motion vector in one direction. Thus, one submacroblock has two, three, or four motion vectors.

As shown in FIG. 1C, in the third macroblock type, the two submacroblocks of 8×16 pixels included in one macroblock are subjected to forward prediction (F), backward prediction (B), or bidirectional prediction (BI), respectively. Further, one submacroblock has one motion vector in one direction. Thus, one submacroblock has two, three, or four motion vectors.

As shown in FIG. 1D, in the fourth macroblock type, the four submacroblocks of 8×8 pixels included in one macroblock are subjected to forward prediction (F), backward prediction (B), or bidirectional prediction (BI), respectively. Further, although the secondary submacroblocks included in each submacroblock share a motion predicting direction, the motions of them are independently predicted. Further, each of the secondary submacroblocks included in one submacroblock has one motion vector in one direction. Thus, the number of the secondary submacroblocks included in one macroblock is 16 at the maximum, and when all of them are subjected to bidirectional prediction, one macroblock has 32 motion vectors.

Note that the submacroblock or the secondary submacroblock acting as a unit of prediction of motion is called a motion compensation block.

The number of bits of encoded data per one macroblock is as shown in FIG. 3. FIG. 3 will be briefly explained from a left side as follows.

(1) Intra-mode: 87 bits;
(2) Inter-mode, first macroblock type, forward prediction or backward prediction: 52 bits;
(3) Inter-mode, first macroblock type, bidirectional prediction: 83 bits
(4) Inter-mode, second or third macroblock type, two submacroblocks are predicted in forward direction or backward direction: 83 bits;
(5) Inter-mode, second or third macroblock type, one submacroblock is predicted in forward direction or backward direction, the other one submacroblock is predicted in bidirection: 114 bits;
(6) Inter-mode, second or third macroblock type, two submacroblocks are predicted in bidirection: 145 bits;

(7) Inter-mode, first to fourth macroblock types, all the motion compensation blocks are predicted in forward direction in P picture: 473 bits at the maximum: 473 bits;
(8) Inter-mode, fourth macroblock type, four submacroblocks are predicted in forward direction or backward direction: 473 bits;
(9) Inter-mode, fourth macroblock type, three submacroblocks are predicted in forward direction or backward direction, one submacroblock is predicted in bidirection: 582 bits;
(10) Inter-mode, fourth macroblock type, two submacroblocks are predicted in forward direction or backward direction, two submacroblocks are predicted in bidirection: 691 bits;
(11) Inter-mode, fourth macroblock type, one submacroblock is predicted in forward direction or backward direction, three submacroblocks are predicted in bidirection: 800 bits; and
(12) Inter-mode, fourth macroblock type, four submacroblocks are predicted in bidirection: 909 bits.

Accordingly, since the encoded data of H.264 per one macroblock is 909 bits at the maximum, it cannot be transmitted in a band of 256 bits per one macroblock prescribed by SMPTE 319-2000 standard.

Accordingly, to realize recoding while suppressing deterioration of image quality caused by the recoding as much as possible, any one of 1) a method of expanding a transmission band and 2) a method of effectively disposing data in a conventional transmission band.

Although the method of the item 1) is easy, when data is further multiplexed, it is contemplated that a disadvantage such as formation of a special visible pattern in an image, and the like. Further, it is also contemplated that compatibility with an MPEG-2 recoding device making use of a present system may be greatly broken.

As a result, the method of the item 2) cannot help being employed. When the method of the item 2) is employed, there is a possibility that an object of "suppressing deterioration of image quality as much as possible" cannot be achieved when data is disposed by an easy-going manner (that is, "easy-going data reduction").

Accordingly, an object of the present invention is to provide an encoded data selection method and an encoded data selection device which can restrict encoded data per one macroblock transmitted from a decoding device to a recoding device to a predetermined value (for example, 256 bits) or less while suppressing the lack ratio of the amount of information of the encoded data.

Further, an object of the present invention is to provide an encoded data setting method and an encoded data setting method which can suppress deterioration of quality of a recoded image which is recoded by a recoding device making use of encoded data selected by the encoded data selection method and the encoded data selection device and shown by a bit stream.

SUMMARY OF THE INVENTION

According to a first aspect of the present invention, there is provided an encoded data output method of outputting encoded data of respective macroblocks corresponding to an input bit stream in a predetermined number of bits or less, the method including a prediction mode determination step for determining whether or not a prediction mode applied to the macroblocks is a predetermined prediction mode; an encoded data selection step for selecting a predetermined type of encoded data corresponding to the pixels at predetermined positions in the macroblocks to which the predetermined prediction mode is applied; and a bit distribution step for more preferentially distributing bits to a predetermined type of encoded data selected at the encoded data selection step than a predetermined type of encoded data that is not selected at the encoded data selection step in the macroblocks to which the predetermined prediction mode is applied.

In the encoded data output method, the bit distribution step may reduce the predetermined type of encoded data which is not selected at the encoded data selection step.

In the encoded data output method, the bit distribution step may distribute bits as many as or less than the bits in the input bit stream to the predetermined type of encoded data selected at the encoded data selection step.

In the encoded data output method, the predetermined prediction mode may be a mode for further dividing the submacroblocks constituting each of the macroblocks to one or a plurality of secondary submacroblocks and arranging the secondary submacroblocks as motion compensation blocks.

In the encoded data output method, the predetermined positions may be four corners of the macroblocks.

In the encoded data output method, when the predetermined type of encoded data of other macroblock lacks, the predetermined positions may be positions relating to the predetermined type of encoded data utilized to reproduce the predetermined type of lacking encoded data.

In the encoded data output method, the predetermined type of encoded data may include at least a motion vector.

In the encoded data output method, a predicting direction determination step may be applied to determine whether or not a predicting direction applied to the respective submacroblocks included in the macroblocks, to which the predetermined prediction mode is applied, is bidirection; and the encoded data selection step may be applied only to the submacroblocks to which it is determined that the predicting direction thereof is not bidirection at the predicting direction determination step.

In the encoded data output method, a predicting direction determination step may be applied to determine whether or not a predicting direction applied to the respective submacroblocks included in the macroblocks, to which the predetermined prediction mode is applied, is bidirection; and the encoded data selection step may be applied to the submacroblocks to which it is determined that the predicting direction thereof is not bidirection at the predicting direction determination step, and the encoded data selection step is applied or not applied to the submacroblocks to which it is determined that the predicting direction thereof is bidirection at the predicting direction determination step.

In the encoded data output method, a predicting direction determination step may be applied to determine whether or not a predicting direction applied to the respective submacroblocks included in the macroblocks, to which the predetermined prediction mode is applied, is bidirection; and the encoded data selection step may be applied to the macroblocks only when the number of the submacroblocks, which is included in the macroblocks to which the predetermined prediction mode is applied, and to which a bidirectional predicting direction is applied, is a predetermined value or less.

In the encoded data output method, the encoded data selection step may select a predetermined type of encoded data, which corresponds to secondary submacroblocks including the pixels at the predetermined positions in the macroblocks, in the macroblocks to which the predetermined prediction mode is applied.

In the encoded data output method, bits may not be reduced as to encoded data of a type other than the predetermined type.

According to a second aspect of the present invention, there is provided a recoded data creation method including the respective steps of the encoded data output method; a decode step for decoding a base band signal from an input bit stream; and a multiplex step for multiplexing encoded data, which is obtained by applying the encoded data output method to the input bit stream, to the base band signal.

According to a third aspect of the present invention, there is provided an encoded data restore method of restoring the encoded data of respective macroblocks for encoding based on the encoded data of respective macroblocks created by an encoded data output method of outputting encoded data of respective macroblocks corresponding to an input bit stream in a predetermined number of bits or less, the method including a prediction mode determination step for determining whether or not a prediction mode applied to the macroblocks is a predetermined prediction mode; an encoded data selection determination step for determining, in the encoded data output method, that encoded data of a predetermined type corresponding to the pixels at the predetermined positions in the macroblocks is selected in the macroblocks to which the predetermined prediction mode is applied; a bit distribution determination step for determining, in the encoded data output method, that bits are more preferentially distributed to a predetermined type of encoded data selected at the encoded data selection step than a predetermined type of encoded data that is not selected at the encoded data selection step in the macroblocks to which the predetermined prediction mode is applied; and an encoded data restore step for restoring the encoded data of the respective macroblocks for recoding based on a result of the bit distribution determination step.

In the encoded data restore method, it may be determined at the bit distribution determination step that the predetermined type of encoded data, which is determined to be not selected in the encoded data output method at the encoded data selection determination step, is reduced in the encoded data output method.

In the encoded data restore method, it may be determined at the bit distribution determination step that bits, which are the same or less than the bits in the input bit stream, are distributed to or reduced from the predetermined type of encoded data which is determined to be selected in the encoded data output method at the encoded data selection determination step in the encoded data output method.

In the encoded data restore method, the predetermined prediction mode may be a mode for further dividing the submacroblocks constituting each of the macroblocks to one or a plurality of secondary submacroblocks and arranging the secondary submacroblocks as motion compensation blocks.

In the encoded data restore method, the predetermined positions may be four corners of the macroblocks.

In the encoded data restore method, when the predetermined type of coded data of other macroblock lacks, the predetermined positions may be positions relating to the predetermined type of coded data utilized to reproduce the predetermined type of lacking coded data.

In the encoded data restore method, the predetermined type of coded data may include at least a motion vector.

In the encoded data restore method, a predicting direction determination step may be applied to determine whether or not a predicting direction applied to the respective submacroblocks included in the macroblocks, to which the predetermined prediction mode is applied, is bidirection; and the encoded data selection step may be applied only to the submacroblocks to which it is determined that the predicting direction thereof is not bidirection at the predicting direction determination step.

In the encoded data restore method, a predicting direction determination step may be applied to determine whether or not a predicting direction applied to the respective submacroblocks included in the macroblocks, to which the predetermined prediction mode is applied, is bidirection; and the encoded data selection step may be applied to the submacroblocks to which it is determined that the predicting direction thereof is not bidirection at the predicting direction determination step, and the encoded data selection step is applied or not applied to the submacroblocks to which it is determined that the predicting direction thereof is bidirection at the predicting direction determination step.

In the encoded data restore method, a predicting direction determination step may be applied to determine whether or not a predicting direction applied to the respective submacroblocks included in the macroblocks, to which the predetermined prediction mode is applied, is bidirection; and the encoded data selection step may be applied to the macroblocks only when the number of the submacroblocks, which is included in the macroblocks to which the predetermined prediction mode is applied, and to which a bidirectional predicting direction is applied, is a predetermined value or less.

In the encoded data restore method, at the encoded data selection step, it may be determined that a predetermined type of encoded data, which corresponds to secondary submacroblocks including the pixels at the predetermined positions in the macroblocks, is selected in the macroblocks to which the predetermined prediction mode is applied, in the encoded data output method.

In the encoded data restore method, as to a type of encoded data other than the predetermined type, the encoded data may be restored based on that bits are not reduced in the encoded data output method.

According to a fourth aspect of the present invention there is provided an encoding method including the respective steps of the encoded data restore method; and an encode step for encoding an input base band signal making use of the encoded data restored by the encoded data restore method.

The encoded data output method according to the present invention includes the prediction mode determination step for determining whether or not a prediction mode applied to the macroblocks is a predetermined prediction mode, the encoded data selection step for selecting a predetermined type of encoded data corresponding to the pixels at predetermined positions in the macroblocks to which the predetermined prediction mode is applied, and the bit distribution step for more preferentially distributing bits to a predetermined type of encoded data selected at the encoded data selection step than a predetermined type of encoded data that is not selected at the encoded data selection step in the macroblocks to which the predetermined prediction mode is applied. Accordingly, it is possible to suppress the number of bits of the encoded data per each macroblock to less than a predetermined value as well as to limit the encoded data per one macroblock transmitted from the decoding device to the recoding device to less than a predetermined value while suppressing the lack ratio of the amount of information of the encoded data as much as possible by properly setting a predetermined prediction mode, and a predetermined type of encoded data corresponding to the pixels at the predetermined positions in the macroblocks or a combination of them.

BRIEF DESCRIPTION OF THE DRAWINGS

FIG. 3 is a table for explaining the number of bits of encoded data per one macroblock in a conventional example;

FIGS. 8A to 8D are views showing a secondary submacroblock (that is, motion compensation block) including the pixels shown in FIG. 7 in the encoded data selection method shown in FIG. 5;

FIGS. 9A to 9F are views showing a motion vector selected by the encoded data selection method shown in FIG. 5 in the example 1 of the present invention;

FIG. 10 is a table showing the secondary submacroblock (that is, a motion compensation block) in which a motion vector is selected by the encoded data selection method shown in FIG. 5 in the example 1 of the present invention;

FIG. 11 is a table explaining the number of bits of encoded data per one macroblock when the encoded data selection method shown in FIG. 5 is applied in the example 1 of the present invention;

FIG. 12 is a view explaining a direct mode in H.264;

FIGS. 15A to 15F are views showing a motion vector selected by the encoded data selection method shown in FIG. 5 in an example 2 of the present invention;

FIG. 16 is a table showing the secondary submacroblock (that is, motion compensation block) in which a motion vector is selected by the encoded data selection method shown in FIG. 5 in an example 2 of the present invention; and FIG. 17 is a table explaining the number of bits of encoded data per one macroblock when the encoded data selection method shown in FIG. 5 is applied in the example 2 of the present invention.

DESCRIPTION OF THE PREFERRED EMBODIMENTS

A best mode for embodying the present invention will be explained below in detail with reference to the drawings.

Example 1

Figure 4:
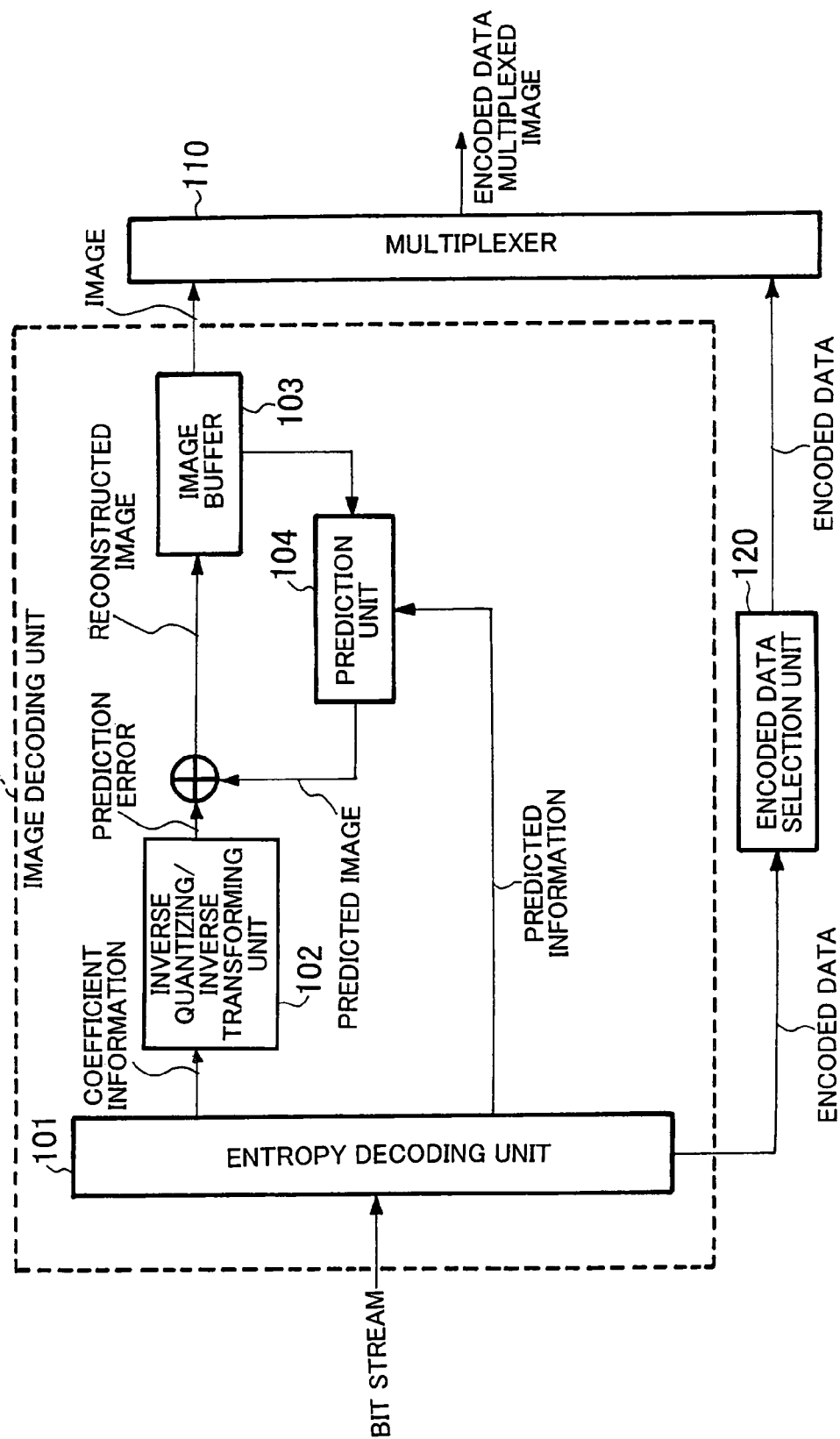
FIG. 4 is a block diagram showing a structure of an image decoding device with an encoded data multiplexing function according to an embodiment of the present invention.

Referring to FIG. 4, an image decoding device with an encoded data multiplexing function according to the embodiment has an image decoding unit 100, a multiplexer 110, and an encoded data selection unit 120 as a characteristic unit of the present invention.

The image decoding unit 100 includes an entropy decoding unit 101, an inverse quantization/inverse transformation unit 102, an image buffer 103, and a prediction unit 104. Operation of the image decoding unit 100 will be explained below.

The entropy decoding unit 101 extracts coefficient information and prediction information by entropy decoding a bit stream input thereto.

The inverse quantization/inverse transformation unit 102 obtains a prediction error by inverse quantizing and inverse transforming the coefficient information supplied from the entropy decoding unit 101.

The prediction unit 104 creates a predicted image from a reconstructed image stored in the image buffer 103 making use of the prediction information supplied from the entropy decoding unit 101.

The predicted image is made to the reconstructed image by being added with the prediction error supplied from the inverse quantization/inverse transformation unit 102. The reconstructed image is stored in the image buffer 103 so that it is decoded later.

The reconstructed image stored in the image buffer 103 is output to the outside through the multiplexer 110 at appropriate display timing.

The image decoding unit 100 has been explained as above.

Subsequently, operation of the multiplexer 110 will be explained.

The multiplexer 110 has a function for multiplexing encoded data, which is extracted and formatted by the encoded data selection unit 120, to a video base band signal decoded by the image decoding unit 100. The video base band signal is synchronized with the encoded data. The format after the multiplexing is carried out is prescribed by SMPTE 319-2000, and multiplexing is carried out at chroma (LSB) of a video signal having luminance of 10 bits and chroma of 10 bits.

The multiplexer 110 has been explained as above.

Subsequently, the encoded data selection unit 120 as the characteristic unit of the present invention will be explained.

The encoded data is supplied to the encoded data selection unit 120 from the entropy decoding unit 101 in the image decoding device.

Figure 5:
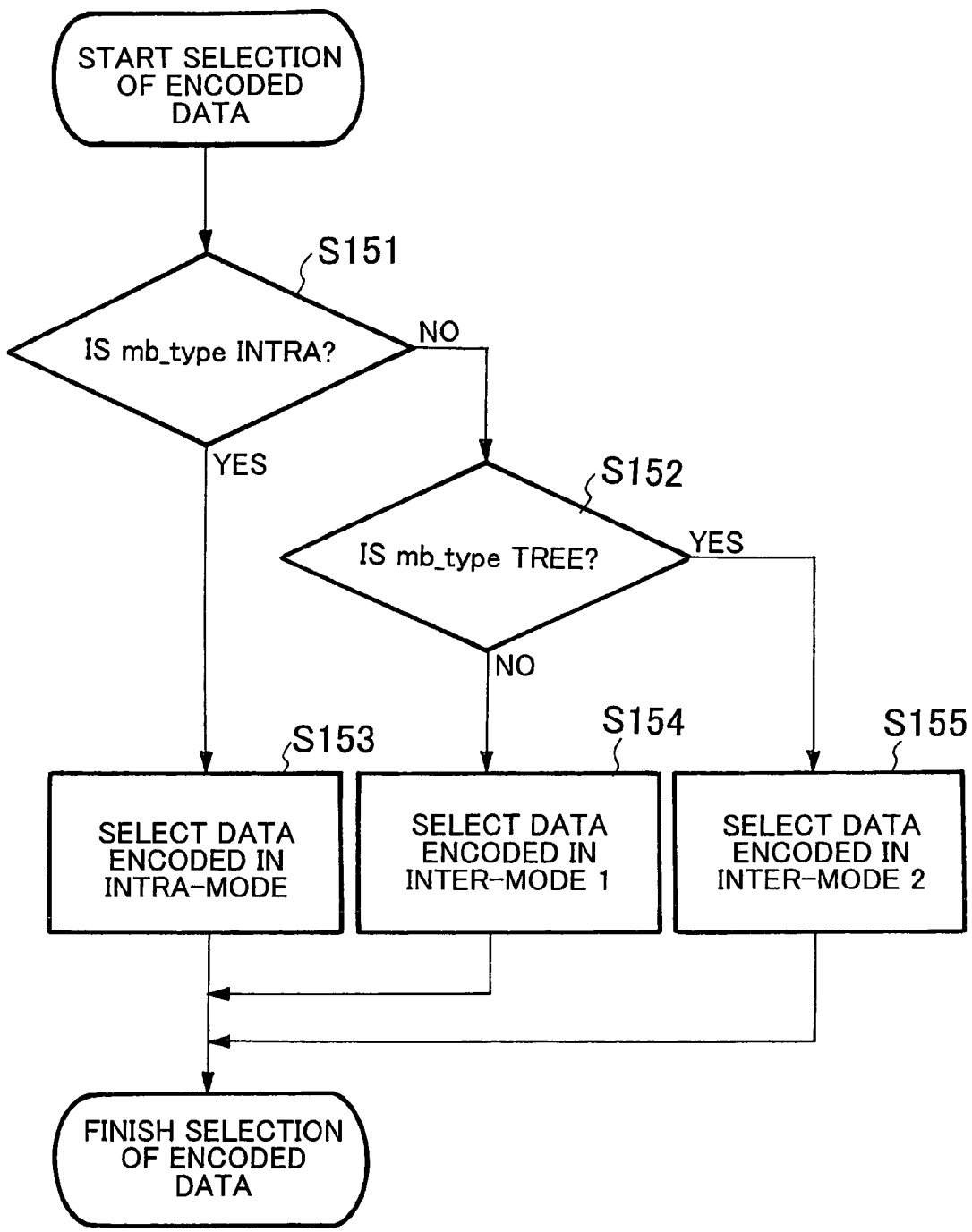
FIG. 5 is a flowchart showing a flowchart showing an encoded data selection method carried out by an encoded data selection unit shown in FIG. 4.

Operation of the encoded data selection unit 120 will be explained with reference to a flowchart of FIG. 5.

At step S151, it is determined whether or not mb_type is the intra-mode. When mb_type is the intra-mode, the process the process goes to step S153, and when mb_type is not the intra-mode, the process goes to step S152.

Figure 1A:
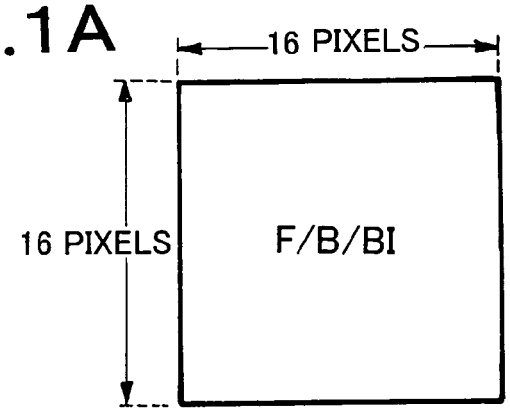
FIGS. 1A to 1D are views showing a manner for dividing a macroblock to four types.
Figure 1B:
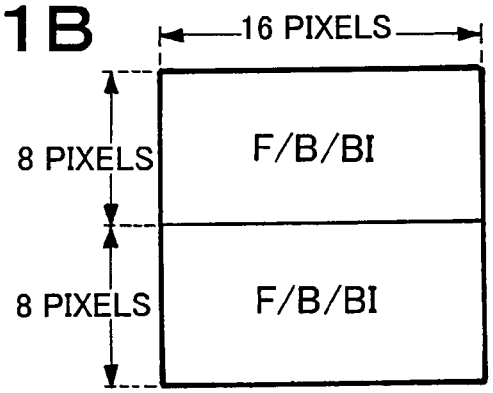
Figure 1C:
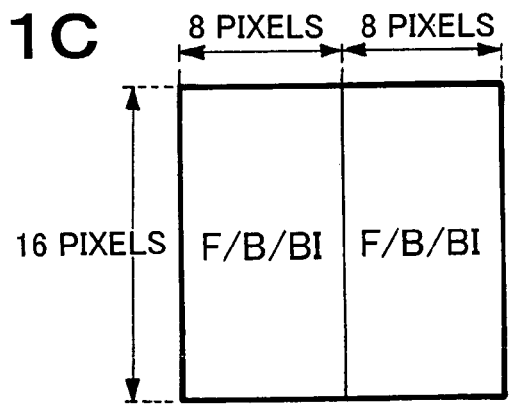
Figure 1D:
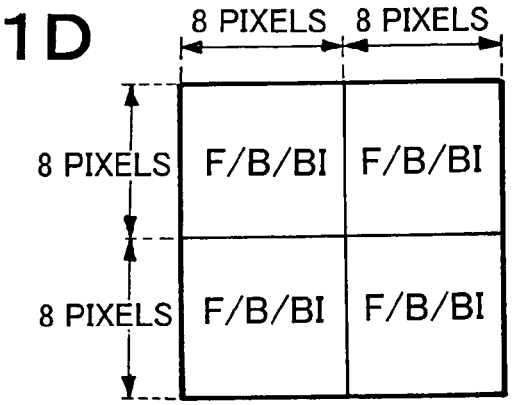
Figure 2A:
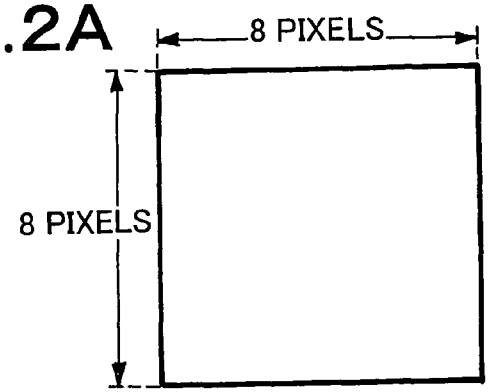
FIGS. 2A to 2D are views showing a manner for dividing a submacroblock to four types.
Figure 2B:
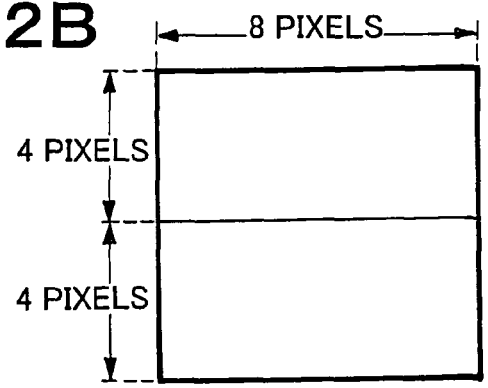
Figure 2C:
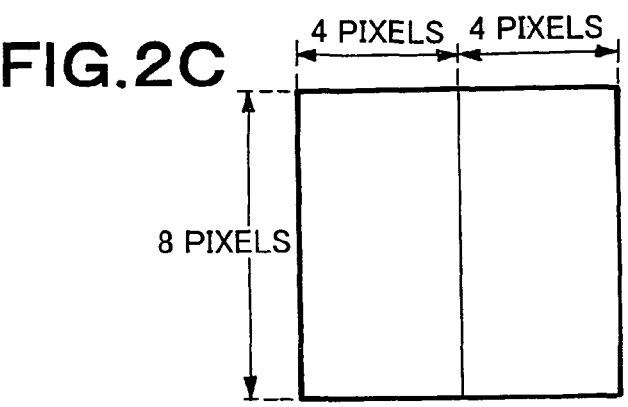
Figure 2D:
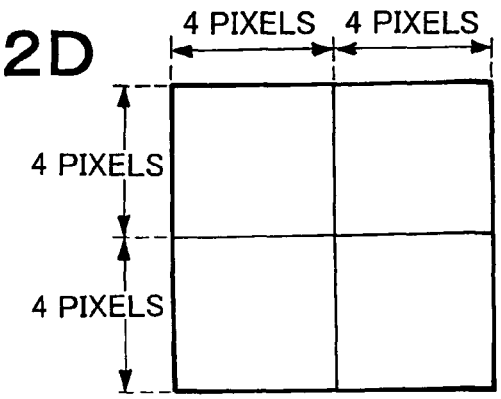

At step S152, it is determined whether or not mb_type is a tree-mode. The tree mode is a mode in which a macroblock is divided into four submacroblocks as shown in FIG. 1D and further each submacroblock is divided into a secondary submacroblock shown in any of FIG. 2A to FIG. 2D. When mb_type is not the tree mode, the process goes to step S154, and when mb_type is the tree mode, the process goes to step S155.

At step S153 (intra-mode), since the encoded data input from the entropy decoding unit 101 has 87 bits per one macroblock as shown in FIG. 3 and thus has bits less than 256 bits, the encoded data is output as it is. That is, all the encoded data is selected. Accordingly, in the intra-mode, the information of the encoded data does not lack. After the encoded data is selected, the processing is finished (prepares for selection of the encoded data of a next macroblock).

As apparent from FIG. 3, at step 154 (at which mb_type is the inter-mode but is not the in tree mode) (inter 16×16, 16×8, or 8×16), the code data per one macroblock can be expressed by:

52 bits as to encoded data of 16×16 mode when it is predicted in one direction and 83 bits when it is predicted in bidirection;

83 bits as to encoded data of 16×8 mode or 8×16 mode predicted only in one direction;

114 bits as to encoded data of 16×8 mode or 8×16 mode when one of them is predicted in one direction and the other is predicted in bidirection; and 145 bits as to encoded data of 16×8 mode or 8×16 mode predicted only in bidirection.

Since the number of bits of the code data per one macroblock is less than 256 bits, the encoded data is output as it is. That is, all the encoded data is selected. Accordingly, in the mode which is the inter-mode but is not the tree mode, the information of the encoded data does not lack. After the encoded data is selected, the processing is finished (prepares for selection of the encoded data of a next macroblock).

At step S155 (tree mode), a macroblock is classified to six types referring to the encoded data as shown in FIGS. 6A to 6F.

Figure 6:
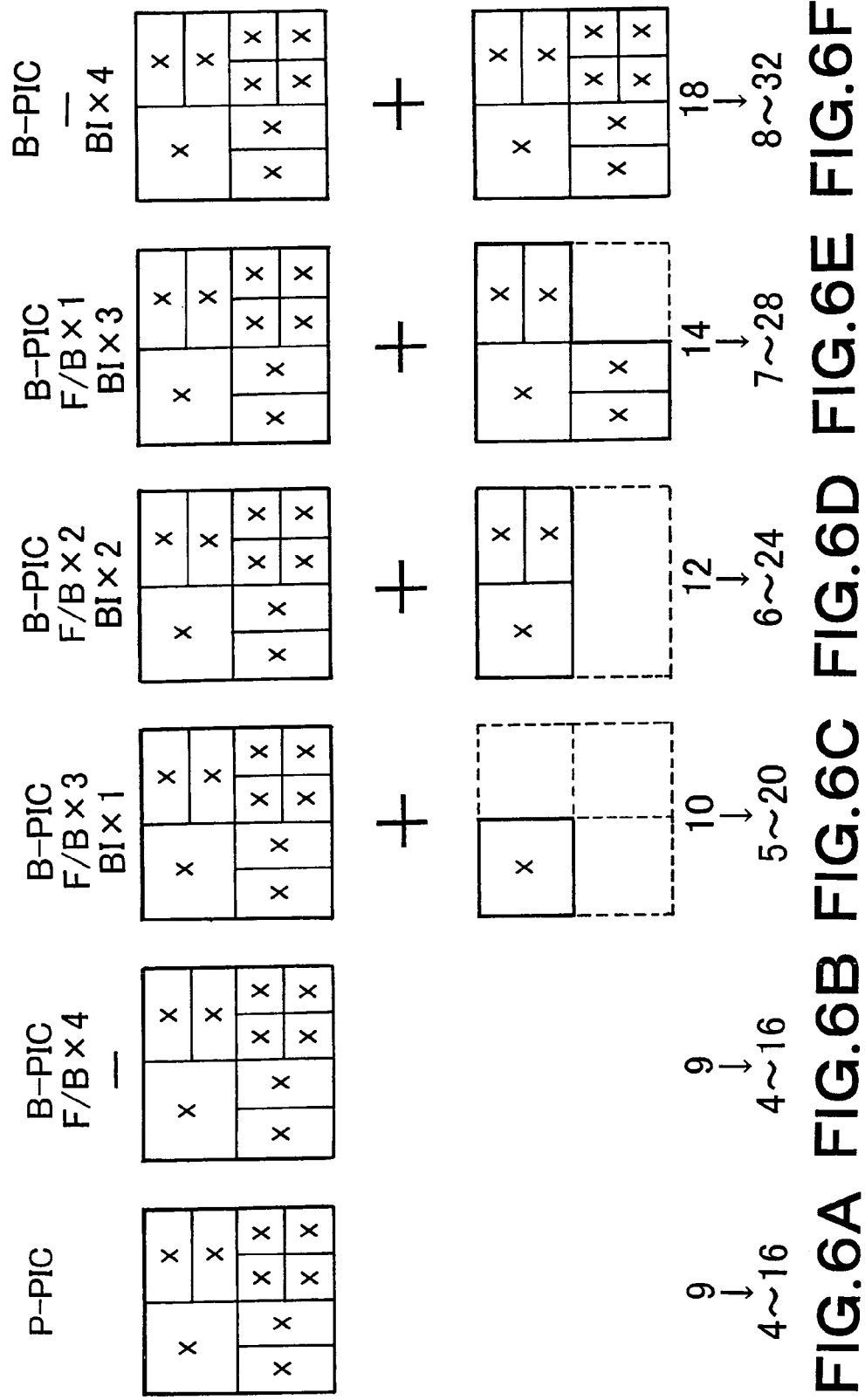
FIGS. 6A to 6F are views showing a motion vector transmitted when the encoded data selection method shown in FIG. 5 is not applied in an example 1 of present invention.

The type shown FIG. 6A is a type of a macroblock in a P picture and all (four) the submacroblocks are predicted in forward direction. Since each submacroblock is divided to one to four secondary submacroblocks, the number of motion compensation blocks per one macroblock is 4 to 16. FIG. 6A shows an example in which the number of motion compensation blocks per one macroblock is 9. Further, the number of motion vectors per one motion compensation block is 1 at all times. Accordingly, in the type shown in the FIG. 6A, the maximum number of motion vectors per one macroblock is 16. As shown in a seventh column of FIG. 3, the encoded data per one macroblock of the type shown in FIG. 6A has 473 bits at the maximum.

The type shown in FIG. 6B is one type of a plurality of types of a macroblock in a B picture, and all (four) the submacroblocks are predicted in forward direction or backward direction. Since each submacroblock is divided to one to four secondary submacroblocks, the number of motion compensation blocks per one macroblock is 4 to 16. FIG. 6A shows an example in which the number of motion compensation blocks per one macroblock is 9. Further, the number of motion vectors per one motion compensation block is 1 at all times. Accordingly, in the type shown in FIG. 6B, the maximum number of motion vectors per one macroblock is 16. As shown in an eighth column of FIG. 3, the encoded data per one macroblock of the type shown in FIG. 6B has 473 bits at the maximum.

The type shown in FIG. 6C is one type of the plurality of types of the macroblock in the B picture, and three submacroblocks are predicted in forward direction or backward direction and one submacroblock is predicted in bidirection. Since each submacroblock is divided to one to four secondary submacroblocks, the number of motion compensation blocks per one macroblock is 5 to 20. FIG. 6C shows an example in which the number of motion compensation blocks per one macroblock is 9. Further, the number of motion vectors per one motion compensation block predicted in forward direction or backward direction is 1 at all times, and the number of motion vectors per one motion compensation block predicted in bidirection is 2 at all times. Accordingly, in the type shown in FIG. 6C, the maximum number of motion vectors per one macroblock is 20. As shown in a ninth column of FIG. 3, the encoded data per one macroblock of the type shown in FIG. 6C has 582 bits at the maximum.

The type shown in FIG. 6D is one type of the plurality of types of the macroblock in the B picture, two submacroblocks are predicted in forward direction or backward direction, and two submacroblock are predicted in bidirection. Since each submacroblock is divided to one to four secondary submacroblocks, the number of motion compensation blocks per one macroblock is 6 to 24. The FIG. 6D shows an example in which the number of motion compensation blocks per one macroblock is 9. Further, the number of motion vectors per one motion compensation block predicted in forward direction or backward direction is 1 at all times, and the number of motion vectors per one motion compensation block predicted in bidirection is 2 at all times. Accordingly, in the type shown in FIG. 6D, the maximum number of motion vectors per one macroblock is 24. As shown in a tenth column of FIG. 3, the encoded data per one macroblock of the type shown in FIG. 6D has 691 bits at the maximum.

The type shown in FIG. 6E is one type of the plurality of types of the macroblock in the B picture, one submacroblock is predicted in forward direction or backward direction, and three submacroblocks are predicted in bidirection. Since each submacroblock is divided to one to four secondary submacroblocks, the number of motion compensation blocks per one macroblock is 7 to 28. The FIG. 6E shows an example in which the number of motion compensation blocks per one macroblock is 9. Further, the number of motion vectors per one motion compensation block predicted in forward direction or backward direction is 1 at all times, and the number of motion vectors per one motion compensation block predicted in bidirection is 2 at all times. Accordingly, in the type shown in FIG. 6E, the maximum number of motion vectors per one macroblock is 28. As shown in an eleventh column of FIG. 3, the encoded data per one macroblock of the type shown in the FIG. 6E has 800 bits at the maximum.

The type shown in FIG. 6F is one type of the plurality of types of the macroblock in the B picture, and all (four) the submacroblocks are predicted in bidirection. Since each submacroblock is divided to one to four secondary submacroblocks, the number of motion compensation blocks per one macroblock is 8 to 32. The FIG. 6F shows an example in which the number of motion compensation blocks per one macroblock is 9. Further, the number of motion vectors per one motion compensation block predicted in bidirection is 2 at all times. Accordingly, in the type shown in FIG. 6F, the maximum number of motion vectors per one macroblock is 32. As shown in a twelfth column of FIG. 3, the encoded data per one macroblock of the type shown in FIG. 6F has 909 bits at the maximum.

Accordingly, the maximum number of encoded bits per one macroblock exceeds 256 bits in any of the six types shown in FIGS. 6A to 6F as shown in the seventh to twelfth columns of FIG. 3.

To cope with this problem, at step S155, the number of bits of the encoded data per one macroblock is set less than 256 bits by reducing the number of motion vectors per one macroblock of the tree mode.

In the submacroblock predicted in forward direction or backward direction, the number of motion vectors per submacroblock is 4 at the maximum. In the embodiment, however, a sufficient number of bits are allocated only to one motion vector and no number of bits are allocated to the other motion vectors. For example, only one motion vector is selected.

In contrast, in the submacroblock predicted in bidirection, although the number of motion vectors per submacroblock is 8 at the maximum, no number of bits are allocated to all the motion vectors. That is, no motion vector is selected.

Figure 7:
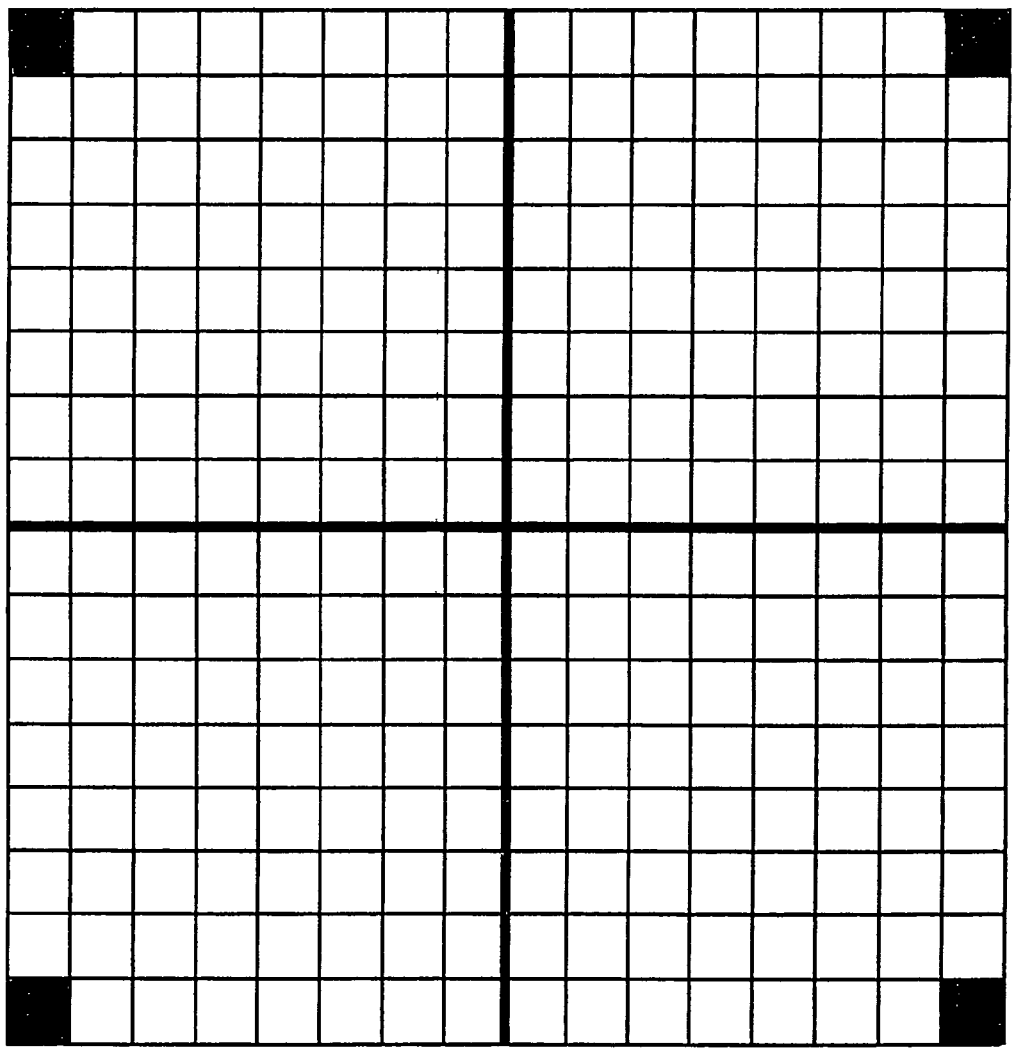
FIG. 7 is a view showing pixels to be included in a secondary submacroblock (that is, motion compensation block) by which a motion vector is selected in the encoded data selection method shown in FIG. 5.

Further, a motion vector as to a motion compensation block including the pixels at the four corners of a macroblock shown in FIG. 7 is used as one motion vector selected with respect to one submacroblock predicted in forward direction or backward direction. That is, to explain, for example, the upper left submacroblock of four submacroblocks shown in FIG. 7, when it is composed of only one secondary submacroblock (that is, motion compensation block) with 8×8 pixels as shown in FIG. 8A, a motion vector as to the secondary submacroblock (that is, motion compensation block) is used as one motion vector selected with respect to a macroblock. When the submacroblock is composed of two secondary submacroblock (that is, motion compensation blocks) of 8×4 pixels as shown in FIG. 8B, a motion vector as to an upper secondary submacroblock (that is, motion compensation block) is used as one motion vector selected with respect to a macroblock. When the submacroblock is composed of two secondary submacroblocks (that is, motion compensation blocks) of 4×8 pixels as shown in FIG. 8C, a motion vector as to a left secondary submacroblock (that is, motion compensation block) is used as one motion vector selected with respect to a macroblock. When the submacroblock is composed of four secondary submacroblocks (that is, motion compensation blocks) of 4×4 pixels as shown in FIG. 8D, a motion vector as to an upper left secondary submacroblock (that is, motion compensation block) is used as one motion vector selected with respect to a macroblock. Although explanation of lower left, upper right, and lower right submacroblocks in the four submacroblocks shown in FIG. 7 is omitted, when, for example, the lower left submacroblock is composed of four secondary submacroblocks (that is, motion compensation blocks) of 4×4 pixels, a motion vector as to the lower left secondary submacroblock (that is, motion compensation block) is used as one motion vector selected with respect to the lower left macroblock.

Which of the secondary submacroblocks includes the pixels at the four corners as shown in FIG. 7 can be determined based on the encoded data.

FIGS. 9A to 9F show examples of a case according to the above selection method. They correspond to the examples shown in FIGS. 6A to 6F.

In the type shown in FIG. 6A, since all (four) the submacroblocks are predicted in forward direction, one motion vector is selected as to each of the four submacroblocks as shown in FIG. 9A. Thus, four motion vectors are selected per one macroblock. Further, the selected motion vectors are motion vectors as to a secondary submacroblock (that is, motion compensation block) including pixels shown by "x" in of FIG. 9A.

In the type shown in FIG. 6B, since all (four) the submacroblocks are predicted in forward direction or backward direction, one motion vector is selected as to each of the respective submacroblocks as shown in FIG. 9B. Thus, four motion vectors are selected per one macroblock. Further, the selected motion vectors are motion vectors as to a secondary submacroblock (that is, motion compensation block) including pixels shown by "x" in FIG. 9B.

In the type shown in FIG. 6C, since three submacroblocks are predicted in forward direction or backward direction and one submacroblock is predicted in bidirection, one motion vector is selected as to each of the three submacroblocks predicted in forward direction or backward direction and a motion vector is discarded as to the one submacroblock predicted in bidirection as shown in FIG. 9C. Thus, three motion vectors are selected per one macroblock. Further, the selected motion vectors are macroblocks as to a secondary submacroblock (that is, motion compensation block) including pixels shown by "x" in FIG. 9A.

In the type shown in FIG. 6D, since two submacroblocks are predicted in forward direction or backward direction and two submacroblocks are predicted in bidirection, one motion vector is selected as to each of the two submacroblocks predicted forward or backward direction and a motion vector is discarded as to the two submacroblocks predicted in bidirection as shown in FIG. 9D. Thus, two motion vectors are selected per one macroblock. Further, the selected motion vectors are macroblocks as to a secondary submacroblock (that is, motion compensation block) including pixels shown by "x" in FIG. 9D.

In the type shown in FIG. 6E, since one submacroblock is predicted in forward direction or backward direction and three submacroblocks are predicted in bidirection, one motion vector is selected as to each of the three submacroblocks predicted in forward direction or backward direction and a motion vector is discarded as to the three submacroblock predicted in bidirection as shown in FIG. 9E. Thus, one motion vector is selected per one macroblock. Further, the selected motion vectors are macroblocks as to a secondary submacroblock (that is, motion compensation block) including pixels shown by "x" in FIG. 9E.

In the type shown in FIG. 6F, since all (four) the submacroblocks are predicted in bidirection, a motion vector is discarded as to the four submacroblocks predicted in bidirection as shown in FIG. 9F. Thus, no motion vector is selected per one macroblock.

FIG. 10 shows a table showing whether or not a motion vector of respective motion compensation blocks is selected in the respective cases of FIGS. 9A to 9F.

Note that, as apparent when FIGS. 6A and 6B are compared with FIGS. 9A and 9B, when a certain submacroblock (for example, upper left submacroblocks shown in FIGS. 6A and 6B) is composed of one secondary submacroblock with 8×8 pixels as well as predicted in forward direction or backward direction, the number of motion vectors corresponding to the submacroblock is one from the beginning and thus the one motion vector is inevitably selected. As a result, all the motion vectors corresponding to the one secondary submacroblock with 8×8 pixels included in the submacroblock are selected.

As apparent from the above explanation, in the macroblock of the tree mode, information lacks in a manner described follows.

The motion vectors of a secondary submacroblock with 8×8 pixels (that is, motion compensation block) predicted in one direction are selected.

Further, in the secondary submacroblocks with pixels less than 8×8 pixels (that is, motion compensation blocks) (specifically, secondary submacroblock with 8×4 pixels predicted in one direction, secondary submacroblock with 4×8 pixels predicted in one direction, and secondary submacroblock with 4×4 pixels predicted in one direction), the motion vectors of secondary submacroblocks with the pixels at the four corners of a macroblock (the pixels shown in FIG. 7) are selected.

On the other hand, in the secondary submacroblocks with pixels less than 8×8 (that is, motion compensation blocks) (specifically, secondary submacroblock with 8×4 pixels predicted in one direction, secondary submacroblock with 4×8 pixels predicted in one direction, and secondary submacroblock with 4×4 pixels predicted in one direction), the motion vectors of secondary submacroblocks no pixels at the four corner of a macroblock (the pixels shown in FIG. 7) are discarded.

Further, the motion vectors of all the secondary submacroblocks (that is, motion compensation blocks) included in the submacroblock predicted in bidirection are selected.

Note that all the encoded data other than the motion vectors are selected. Accordingly, although ref_idx is entirely transmitted, it may not be transmitted.

When the motion vectors are selected by the selection method, the number of bits of the encoded data per one macroblock is as shown in FIG. 11. FIG. 11 will be briefly described from a left side as follows:
(1) Intra-mode: 87 bits;
(2) Inter-mode, first macroblock type, predicted in forward direction or backward direction: 52 bits;
(3) Inter-mode, first macroblock type, predicted in bidirection: 83 bits;
(4) Inter-mode, second or third macroblock type, two submacroblocks are predicted in forward direction or, backward direction: 83 bits;
(5) Inter-mode, second or third macroblock type, one submacroblock is predicted in forward direction or backward direction, the other one submacroblock is predicted in bidirection: 114 bits;
(6) Inter-mode, second or third macroblock type, two submacroblocks are predicted in bidirection: 145 bits;
(7) Inter-mode, first to fourth macroblock types, all the motion compensation blocks are predicted in forward direction in P picture: 161 bits;
(8) Inter-mode, fourth macroblock type, four submacroblocks are predicted in forward direction or backward direction: 161 bits;
(9) Inter-mode, fourth macroblock type, three submacroblocks are predicted in forward direction or backward direction, one submacroblock is predicted in bidirection: 140 bits;
(10) Inter-mode, fourth macroblock type, two submacroblocks are predicted in forward direction or backward direction, two submacroblocks are predicted in bidirection: 119 bits;
(11) Inter-mode, fourth macroblock type, one submacroblock is predicted in forward or backward direction, three submacroblocks are predicted in bidirectional prediction: 98 bits; and
(12) Inter-mode, fourth macroblock type, four submacroblocks are predicted in bidirection: 77 bits Accordingly, even if a macroblock has any type, the number of bits of the encoded data per one macroblock can be suppressed to 256 bits or less.

Note that, in the cases of the items (1) to (6), since the number of bits of the encoded data per one macroblock is 256 bits or less from the beginning, bits are not reduced at step S153 or S154 carried out in these cases, and thus the numbers of the encoded data per one macroblock is the same as the values shown in FIG. 3. In the cases of the items (7) to (12), since the number of bits of the encoded data per one macroblock exceeds 256 bits from the beginning, bits are reduced at step S155 carried out in these cases, and thus the number of the encoded data per one macroblock is reduced from the values shown in FIG. 3.

It is possible to restrict the maximum number of bits per one macroblock to a predetermined value (for example, 256 bits) or less by setting a limit to the number of motion vectors making use of the selection method described above. However, the frequency of occurrence of the secondary submacroblocks with a size less than 8×8 bits to which the selection of motion vector is applied (that is, motion compensation blocks) is statistically small, the encoded data has a small lack ratio. Accordingly, even if an image is recoded making use of the encoded data using the selection method described above, it is possible to suppress deterioration of image quality of a recoded image as much as possible.

In the submacroblocks of the tree mode of the embodiment, one motion vector located at the four corners of the macroblock is selected as a representative motion vector of the submacroblock as shown in FIG. 7 making use of the following three characteristics.

Frequency of occurrence of the tree mode is statistically low;

Frequency of occurrence of secondary submacroblocks (that is, motion compensation blocks) with pixels less than 8×8 bits is statistically low in the tree mode; and Frequency of occurrence of a direct mode, which can reproduce motion vector from the P picture at the same position, is high in the B picture having a tendency to have many motion vectors As shown in FIG. 12, the motion vectors located at the four corners of the macroblock are motion vectors used by the direct mode of H.264 (as to the detail of the direct mode, refer to the advice of H.264, ISO/IEC 14496-10 8.4.1.2 Derivation process for luma motion vectors for B_Skip, B_Direct_16×16, and B_Direct_8×8). In the direct mode, the motion vector is calculated based on the motion vector as to the position shown in FIG. 12. Accordingly, even if the motion vector of the B picture is not selected and lacks, it can be reproduced from the motion vector of an adjacent reference picture (shown by "Reference PIC1" in FIG. 12) in a time axis.

Figure 13:
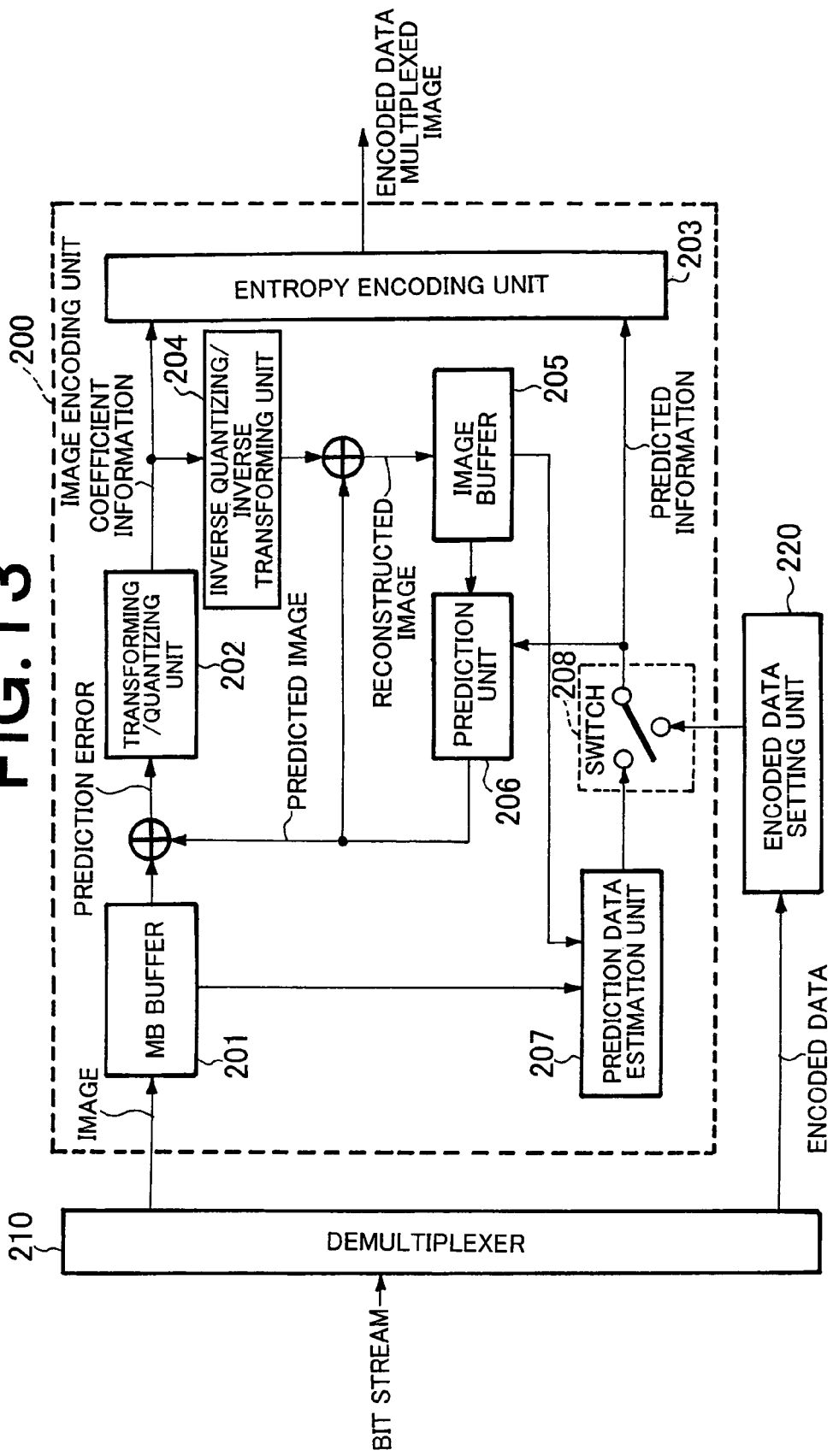
FIG. 13 is a block diagram showing an arrangement of an image recoding device according to the embodiment of the present invention.

FIG. 13 shows an image recoding device to which data, which is obtained by multiplexing a video base band signal output from the image decoding device with the encoded data multiplexing function shown in FIG. 4 to encoded data, is input. As described above, the amount of information of encoded data (specifically, motion vector of 1 or more) lacks in a part of macroblock in the tree mode. Accordingly, the recoding device must be operated in consideration of it.

The image recoding device of the embodiment includes a demultiplexer 210, an image encoding unit 200, and an encoded data setting unit 220 as a characteristic unit of the present invention.

The demultiplexer 210 will be explained.

The demultiplexer 210 carries out operation opposite to the multiplexer 110. That is, the demultiplexer 210 is input with the video base band signal to which the encoded data is multiplexed and separates them from each other. The format of the multiplexed encoded data is prescribed by SMPTE 319-2000 and a multiplexing position is the chroma LSB of a video signal having luminance of 10 bits and chroma of 10 bits.

The demultiplexer 210 has been explained as above.

Subsequently, the image encoding unit 200 will be explained.

The image encoding unit 200 includes a macroblock buffer (MB buffer) 201, a transformation/quantization unit 202, an entropy coding unit 203, an inverse quantization/inverse transformation unit 204, an image buffer 205, a prediction unit 206, a prediction data estimation unit 207, and a switch 208.

The MB buffer 201 stores an image of one macroblock supplied from the demultiplexer 210.

The prediction data estimation unit 207 estimates prediction information for preferably predicting an input image stored in the MB buffer 201 from a reconstructed image stored in the image buffer 205.

The prediction unit 206 creates a predicted image from the reconstructed image stored in the image buffer 205 making use of the prediction information supplied through the switch 208.

A prediction error is obtained by subtracting the predicted image, which is supplied from the prediction unit 206, from the image stored in the MB buffer 201.

The prediction error is transformed and quantized by the transformation/quantization unit 202 and coefficient information as an output therefrom is supplied to the entropy coding unit 203 and the inverse quantization/inverse transformation unit 204.

The entropy coding unit 203 makes the coefficient information and the prediction information supplied thereto to an entropy code and outputs the coded train thereof to the outside as a bit stream.

The inverse quantization/inverse transformation unit 204 restores a prediction error by inverse quantizing and inverse transforming the coefficient information supplied from the transformation/quantization unit 202.

The predicted image is made to a reconstructed image by being added with the prediction error supplied from the inverse quantization/inverse transformation unit 204. The reconstructed image is stored in the image buffer 205 so that it is encoded later.

A bit stream is obtained by applying the above processing to the macroblocks of all the images.

The image encoding unit 200 has been explained as above.

Subsequently, the encoded data setting unit 220 as the characteristic unit of the present invention will be explained.

The encoded data setting unit 220 is supplied with encoded data from the demultiplexer 210. The encoded data setting unit 220 controls the switch 208 according to the encoded data input thereto. When the amount of the information of the encoded data lacks, prediction information of the prediction data estimation unit 207 is, supplied to the prediction unit 206, whereas when it does not lack, the prediction information included in the encoded data supplied from the demultiplexer 210 is supplied to the prediction unit 206.

Figure 14:
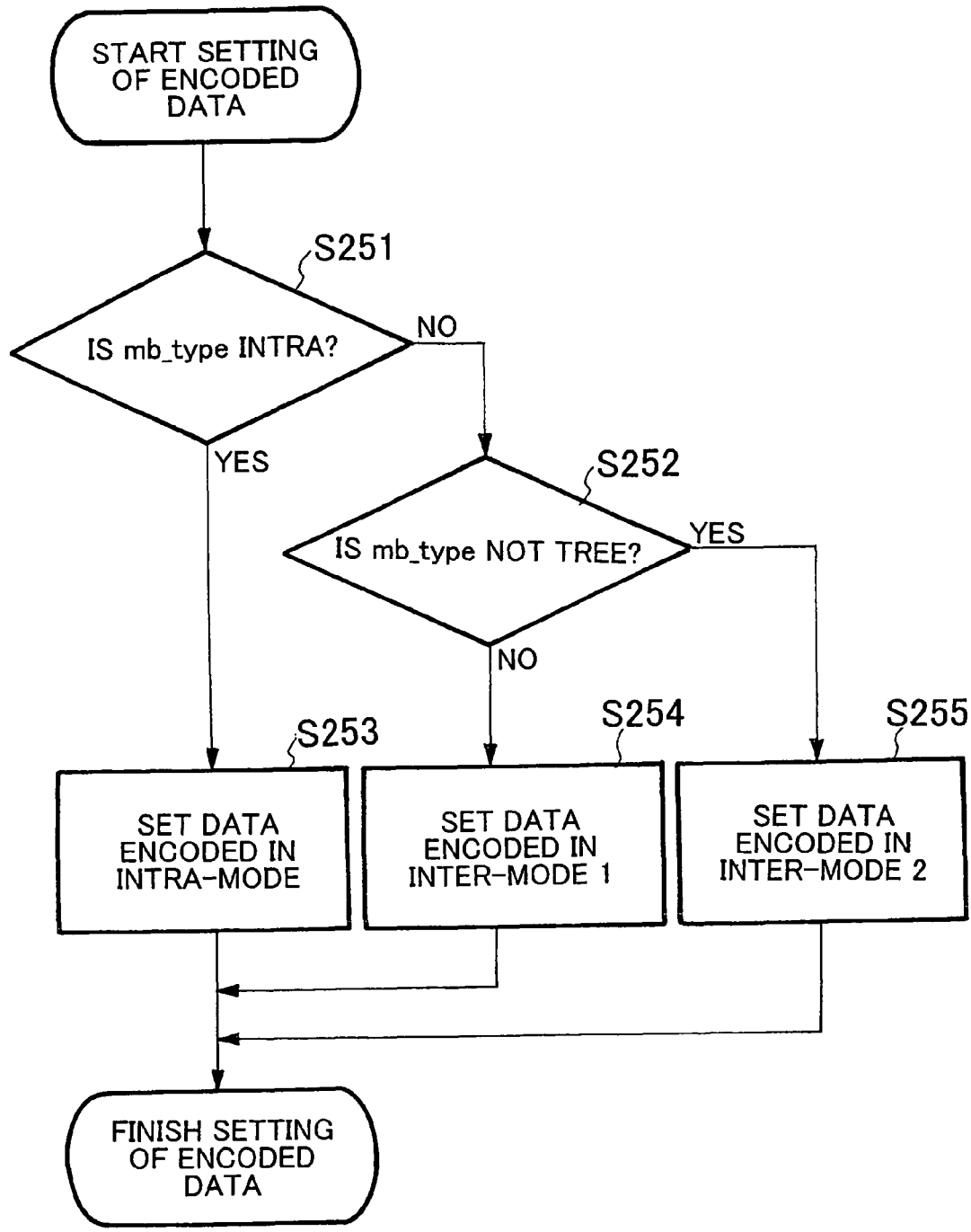
FIG. 14 is a flowchart showing an encoded data setting method carried out by an encoded data setting unit shown in FIG. 13.

Operation of the encoded data selection unit 220 and the switch 208 will be explained with reference to a flowchart of FIG. 14.

At step S15, it is determined whether or not mb_type is the intra-mode. When mb_type is the intra-mode, the process goes to step S253, and when mb_type is the intra-mode, the process goes to step S252.

At step S252, it is determined whether or not mb_type is the the tree mode. When mb_type is not the tree mode, the process goes to step, and when mb_type is the tree mode, the process goes to step S255.

At step S253 (intra-mode), since the encoded data of intra-mode can be shown by a number of bits smaller than 256 bits of the transmission band from the beginning as apparent from the explanation of the image decoding device with the encoded data multiplexing function, the amount of information is not reduced at all by the encoded data selection unit 120. Accordingly, the prediction information included in the encoded data supplied from the demultiplexer 210 is supplied to the prediction unit 206 by switching the switch 208 to the encoded data setting unit 220 side, thereby the processing is finished.

At step S254 (at which mb_type is the inter-mode but is not the tree mode) (inter 16×16, 16×8, or 8×16), the encoded data of the macroblock of the mode which is the inter-mode but is not the tree mode from the beginning can be shown by a transmission band with bits smaller than 256 bits as apparent from explanation of the image decoding device with the encoded data multiplexing function. Thus, the amount of information is not reduced at all by the encoded data selection unit 120. Accordingly, the prediction information included in the encoded data supplied from the demultiplexer 210 is supplied to the prediction unit 206 by switching the switch 208 to the encoded data setting unit 220 side, thereby the processing is finished.

How information lacks in the macroblock of the tree mode has been explained in the explanation of the image decoding device with the encoded data multiplexing function. In accordance with the lack of the information, at step S255 (tree mode), as to the secondary submacroblock (that is, motion compensation block) whose information (specifically, motion vector) lacks, the prediction information, which includes the motion vector estimated by the prediction data estimation unit 207, is supplied to the prediction unit 206. On the other hand, as to the secondary submacroblock (that is, motion compensation block) whose information (specifically, motion vector) is selected by the encoded data selection unit 120 (does not lack), the prediction information included in the encoded data supplied from the demultiplexer 210 is supplied to the prediction unit 208. Note that as to the secondary submacroblock whose information (specifically, motion vector) lacks (that is, motion compensation block), when the motion vector can be obtained by the direct mode, it is utilized. Further, since the encoded data other than the motion vector is selected by the encoded data selection unit 120, it is supplied to the prediction unit 206.

At step S255 (tree mode), the encoded data setting unit 220 determines to which one of the six kinds of types shown in FIGS. 6A to 6F the respective macroblocks belong referring to the encoded data supplied thereto likewise the encoded data selection unit 120. Further, the encoded data setting unit 220 determines by which one of the division modes shown in FIG. 2A to FIG. 2D the respective submacroblocks are divided referring to the encoded data likewise the encoded data selection unit 120. Then, it is determined based on the above determination that the motion vector of which secondary submacroblock is selected by the encoded data selection unit 120 and the motion vector of which secondary submacroblock is discarded thereby.

Further, when how respective encoded data are disposed in a region of 256 bits per one macroblock is previously determined between the encoded data selection unit 120 and the encoded data setting unit 220 and how motion vectors are disposed in it is previously determined, the encoded data setting unit 220 can find which motion vector supplied from the encoded data selection unit 120 corresponds to which secondary submacroblock to which it is determined that a motion vector has been selected. When, for example, an order of secondary submacroblocks according to which selected motion vectors are transmitted thereto is previously determined as to respective cases, the encoded data setting unit 220 can find which motion vector supplied from the encoded data selection unit 120 corresponds to which secondary submacroblock to which it is determined that a motion vector has been selected.

Further, to set the number of bits of the encoded data per macroblock to equal to or less than 256 bits, it is sufficient to set the number of motion vectors per one macroblock equal to or less than 7. However, when the number of macroblocks per one macroblock selected by the selection method described above is equal to or less than 6, the selected macroblocks may be transmitted a plurality of times making use of a vacant region. How the motion vectors are disposed between the encoded data selection unit 120 and the encoded data setting unit 220 is previously determined also in this case. With this determination, resistance against error in a transmission path, for example, can be increased.

As to the secondary submacroblock whose information (specifically, motion vector) lacks (that is, motion compensation block), the motion vectors as to the secondary submacroblock may be interpolated based on the motion vectors selected as to peripheral motion compensation blocks at step S255. Further, as to the secondary submacroblock whose information (specifically, motion vector) lacks (that is, motion compensation block), the motion vector selected as to the peripheral motion compensation block may be used as an initiation value for estimating motion vectors as to the secondary submacroblock at step S255. With this operation, the prediction data estimation unit 207 need not to estimate the motion vector as to the secondary submacroblock (that is, motion compensation block) whose information (specifically, motion vector) lacks, thereby an amount of arithmetic operation can be reduced.

In the recoding device of the present invention, since the lacking motion vector is compensated by the prediction data estimation unit 207, image quality is not greatly deteriorated. Further, as explained in relation to the image decoding device with the encoded data multiplexing function, since the motion vector is compensated only by the modes whose probability of occurrence is low, image quality is least affected thereby in its entirety.

Example 2

In the selection method of the motion vector employed in the example 1, all the motion vectors are discarded (no macroblock is selected) as to the submacroblock predicted in bidirection, although there are 8 macroblocks at the maximum per one macroblock from the beginning. With this operation, it is possible to set the number of bits of the encoded data per one macroblock to 161 at the maximum. However, when there is at least one submacroblock predicted in bidirection (ninth to twelfth columns of FIG. 11), a band with 256 bits per one macroblock is not sufficiently used. On the other hand, when motion vectors are transmitted as many as possible to the recode device, there is a possibility that the image quality of a restored image obtained from a bit stream output from the recoding device can be increased. However, when one motion vector is selected as to a submacroblock predicted in forward or backward direction and two motion vectors are selected as to each of 3 submacroblocks predicted in bidirection, the number of bits of encoded data per one macroblock is set to 254 bits which are less than 256 bits. However, when two window motion vectors are selected as to each of the submacroblocks predicted in bidirection, the number of bits of encoded data per one macroblock is set to 280 bits which exceed 256 bits.

To cope with this problem, when the number of macroblocks predicted in bidirection in the macroblock is 1 to 3, a method of additionally selecting a motion vector as to each of the macroblocks predicted in bidirection is employed as a motion vector selection method in the example 2 based on the selection method described above.

FIGS. 15A to 15F show examples of a case according to the second selection method. They correspond to the examples shown in FIGS. 6A to 6F.

The motion vectors selected in the types of FIGS. 6A, 6B and 6F are as shown in FIGS. 9A, 9B and 9F in the first selection method and as shown in FIGS. 9A, 9B and 9F in the second selection method. However, since both the selection methods are common to each other, duplicate explanation is omitted.

In the type shown in FIG. 6C, since three submacroblocks are predicted in forward direction or backward direction and one submacroblock is predicted in bidirection, one motion vector is selected as to each of the three submacroblocks predicted in forward direction or backward direction and two motion vectors are selected as to the one submacroblock predicted in bidirection as shown in FIG. 15C. Thus, the five motion vectors are selected per one macroblock. Further, the selected motion vectors are macroblocks as to a secondary submacroblock (that is, motion compensation block) including pixels shown by "x" shown in FIG. 15C.

In the type shown in FIG. 6D, since two submacroblocks are predicted in forward direction or backward direction and two submacroblocks are predicted in bidirection, one motion vector is selected as to each of the two submacroblocks predicted in forward direction or backward direction as shown in FIG. 15D and two motion vectors are selected as to the two submacroblocks predicted in bidirection. Thus, the six motion vectors are selected per one macroblock. Further, the selected motion vectors are macroblocks as to a secondary submacroblock (that is, motion compensation block) including pixels shown by "x" shown in FIG. 15D.

In the type shown in FIG. 6E, since one submacroblock is predicted in bidirection and three submacroblocks are predicted in forward direction or backward direction, one motion vector is selected as to the one submacroblock predicted in forward direction or backward direction as shown in FIG. 15E, and two motion vectors are selected as to each of the three submacroblocks predicted in bidirection. Thus, the seven motion vectors are selected per one macroblock. Further, the selected motion vectors are a macroblock as to a secondary submacroblock (that is, motion compensation block) including pixels shown by "x" shown in FIG. 15E.

FIG. 16 shows a table showing whether or not a motion vector of respective motion compensation blocks is selected in the respective cases of FIGS. 15A to 15F.

Note that, as apparent when FIGS. 6A and 6B are compared with FIGS. 15A and 15B, when a certain submacroblock (for example, upper left submacroblocks in FIGS. 6A and 6B) are predicted in forward or backward direction, the number of motion vectors corresponding to the submacroblock is one from the beginning and thus the one motion vector is inevitably selected. As a result, all the motion vectors corresponding to the secondary submacroblock having one 8×8 pixel included in the macroblock are selected.

Further, as apparent when FIGS. 6C, 6D and 6E are compared with FIGS. 15C, 15D and 15E, respectively, when a certain submacroblock (for example, upper left submacroblocks shown in FIGS. 6C, 6D and 6E) is composed of one secondary submacroblock with 8×8 pixels and predicted in bidirection as well as the number of the submacroblocks predicted in bidirection of the four submacroblocks included in a macroblock including the submacroblocks is equal to or less than 3, the number of motion vectors corresponding to the certain submacroblock is two from the beginning and thus the two motion vectors are inevitably selected. As a result, all the motion vectors corresponding to the one secondary submacroblock with 8×8 pixels included in the certain macroblock are selected.

As apparent from the above description, in the macroblock of the tree mode, information lacks in a manner described follows.

The motion vectors of a secondary submacroblock with 8×8 pixels (that is, motion compensation block) predicted in one direction are selected.

Further, when the number of the submacroblocks included in a macroblock and predicted in bidirection is one to three, the motion vectors of the secondary submacroblock (that is, motion compensation block) with 8×8 pixels included in the macroblock and predicted in bidirection are selected.

Further, when the number of submacroblocks included in a macroblock and predicted bidirection is one to three, the motion vectors of the secondary submacroblocks, which include the pixels at the four corners (pixels shown in FIG. 7) of the secondary submacroblock with pixels less than 8×8 pixels (that is, motion compensation block) which is included in the macroblock and predicted in bidirection (specifically, secondary submacroblock with 8×4 pixels predicted in one direction, secondary submacroblock with 4×8 pixels predicted in one direction, and secondary submacroblock with 4×4 pixels predicted in one direction) are selected.

On the other hand, the motion vectors of the secondary submacroblocks, which do not include the pixels at the four corners (pixels shown in FIG. 7) of a macroblock in the secondary submacroblock with pixels less than 8×8 pixels predicted in one direction (that is, motion compensation block) (specifically, secondary submacroblock with 8×4 pixels predicted in one direction, secondary submacroblock with 4×8 pixels predicted in one direction, and secondary submacroblock with 4×4 pixels predicted in one direction), are discarded.

Further, when the number of submacroblocks included in a macroblock and predicted bidirection is one to three, the motion vectors of the secondary submacroblocks, which do not include the pixels at the four corners (pixels shown in FIG. 7) of the secondary submacroblock with pixels less than 8×8 pixels (that is, motion compensation block) which is included in the macroblock and predicted in bidirection (specifically, secondary submacroblock with 8×4 pixels predicted in one direction, secondary submacroblock with 4×8 pixels predicted in one direction, and secondary submacroblock with 4×4 pixels predicted in one direction) are discarded.

Further, when the number of submacroblocks included in a macroblock and predicted bidirection is four, the motion vectors of all the secondary submacroblocks (that is, motion compensation blocks) included in the macroblock are discarded.

When the example 2 is explained in comparison with the example 1, all the motion vectors selected in the example 1 are selected by the example 2. In addition to the above, in the example 2, when the number of submacroblocks included in a macroblock and predicted in bidirection is one to three, the motion vectors of the secondary submacroblock with 8×8 pixels (that is, motion compensation block), which is included in the macroblock and predicted in bidirection, are selected. When the number of submacroblocks included in a macroblock and predicted in bidirection is one to three, the motion vectors of the secondary submacroblocks, which include the pixels at the four corners (pixels shown in FIG. 7) of the secondary submacroblock with pixels less than 8×8 pixels (that is, motion compensation block) which is included in the macroblock and predicted in bidirection (specifically, secondary submacroblock with 8×4 pixels predicted in one direction, secondary submacroblock with 4×8 pixels predicted in one direction, and secondary submacroblock with 4×4 pixels predicted in one direction) are selected.

When the motion vectors are selected as described above, the number of bits of the encoded data per one macroblock is as shown in FIG. 17. FIG. 17 will be briefly described from a left side as follows:

(1) Intra-mode: 87 bits;
(2) Inter-mode, first macroblock type, predicted in forward or backward direction: 52 bits;
(3) Inter-mode, first macroblock type, predicted in bidirection: 83 bits;
(4) Inter-mode, second or third macroblock type, two submacroblocks are predicted in forward direction or backward direction: 83 bits;
(5) Inter-mode, second or third macroblock type, one submacroblock is predicted in forward direction or backward direction, the other one submacroblock is predicted in bidirection: 114 bits;
(6) Inter-mode, second or third macroblock type, two submacroblocks are predicted in bidirection: 145 bits;
(7) Inter-mode, first to fourth macroblock types, all the motion compensation blocks are predicted in forward direction in P picture: 161 bits;
(8) Inter-mode, fourth macroblock type, four submacroblocks are predicted in forward direction or backward direction: 161 bits;
(9) Inter-mode, fourth macroblock type, three submacroblocks are predicted in forward direction or backward direction, one submacroblock is predicted in bidirection: 192 bits
(10) Inter-mode, fourth macroblock type, two submacroblocks are predicted in forward direction or backward direction, two submacroblocks are predicted in bidirection: 223 bits;
(11) Inter-mode, fourth macroblock type, one submacroblock is predicted in forward or backward direction, three submacroblocks are predicted in bidirectional prediction: 254 bits; and
(12) Inter-mode, fourth macroblock type, four submacroblocks are predicted in bidirection: 77 bits Accordingly, even if a macroblock has any type, the number of bits of the encoded data per one macroblock can be suppressed to 256 bits or less.

Further, no motion vector is selected in the item (12).

However, three submacroblocks of the four submacroblocks may be selected, and motion vectors may be selected as to the selected submacroblocks likewise the item (11). Three submacroblocks located at predetermined positions may be selected. Further, in order to select three submacroblocks, a trial calculation may be carried out to find deterioration of image quality can be minimized when the motion vectors of which submacroblock is discarded. Further, the degree of deterioration of image quality may be calculated on a trial base based on the sizes of the motion vectors of respective motion compensation blocks, the difference of the motion vectors between the respective motion compensation blocks, the degree of change of an image of each motion compensation block.

Further, in the item (12), three submacroblocks of the four submacroblocks may be selected, motion vectors may be selected as to the selected submacroblocks likewise the item (11), and further a motion vector may be sent as to the not selected submacroblock by the following method.

As to the respective components of a motion vector, when a motion vector of a secondary submacroblock of a not selected submacroblock including the pixels at the positions shown in FIG. 7 is within a range which can be shown by a predetermined number of bits, the motion vector is transmitted as it is, and when it is not within the range, a value showing invalidity is transmitted in place of the motion vector. For example, it is assumed that the predetermined number of bits is 2 and the range of it is from −0.25 pixel to 0.25 pixel. When the value of an actual motion vector is −0.25 pixel, 0 pixel, or 0.25 pixel, values, for example, "00", "01", "10" showing the values of them are transmitted, respectively, and, when the value of the actual motion vector exceeds the range, "11" showing invalidity is transmitted.

The method is not limited to the case of the item (12) and may be used to utilize excessive bits in other case. In, for example, the item (10), the motion vector of other motion compensation block may be transmitted by the above method using excessive 33 bits. Further, in the item (12), the number of bits per one macroblock may be set to less than 256 pixels by selecting two representative vectors to each of four submacroblocks predicted in bidirection, selecting eight macroblocks per one macroblock, and transmitting the macroblocks in a number of bits smaller than an ordinary number of bits. For example, one motion vector is ordinarily expressed by 26 bits, it may be expressed by 24 bits. Then, a motion vector having an accuracy of 26 bits may be estimated from the motion vector expressed by 24 bit by the prediction data estimation unit 207.

Further, when the number of macroblocks predicted in bidirection in a macroblock is one or one to two in place of one to three, a motion vector may be additionally selected to each of the macroblocks predicted in bidirection.

Note that, although the respective units of the devices shown in FIGS. 4 and 13 may be realized by hardware, they may be realized by that a computer reads and carries out a program for functioning it as these units.

Explanation has been made as to a motion vector with many bits, which is selected when a predetermined condition is satisfied and is discarded when it is not satisfied, as an example. However, encoded data other than the motion vector, for example, may be used as a target to be selected or to be not selected in addition to or in place of the motion vector based on a similar condition.

Further, a certain type of encoded data may be selected when a first predetermined condition (for example, the condition of the example 1) is satisfied and may be discarded when it is not satisfied, and another certain type of encoded data may be selected when a second predetermined condition (for example, the condition of the example 2) is satisfied and may be discarded when it is not satisfied.

What is claimed is:

1. An encoded data output method of outputting encoded data of respective macroblocks corresponding to an input bit stream in a predetermined number of bits or less, comprising:
    a prediction mode determination step for determining whether or not a prediction mode applied to the macroblocks is a predetermined prediction mode;
    an encoded data selection step for selecting a predetermined type of encoded data corresponding to the pixels at predetermined positions in the macroblocks to which the predetermined prediction mode is applied; and
    a bit distribution step for more preferentially distributing bits, the number of which is already determined for each macroblock, to a predetermined type of encoded data selected at the encoded data selection step than a predetermined type of encoded data that is not selected at the encoded data selection step in the macroblocks to which the predetermined prediction mode is applied,
    wherein the prediction mode determination step, the encoded data selection step, and the bit distribution step are executed for each macroblock independently from macroblocks other than said each macroblock.

2. An encoded data output method according to claim 1, wherein, the bit distribution step reduces the predetermined type of encoded data which is not selected at the encoded data selection step.

3. An encoded data output method according to claim 1, wherein the bit distribution step distributes bits as many as or less than the bits in the input bit stream to the predetermined type of encoded data selected at the encoded data selection step.

4. An encoded data output method according to claim 1, wherein the predetermined prediction mode is a mode for further dividing the submacroblocks constituting each of the macroblocks to one or a plurality of secondary submacroblocks and arranging the secondary submacroblocks as motion compensation blocks.

5. An encoded data output method according to claim 1, wherein the predetermined positions are four corners of the macroblocks.

6. An encoded data output method according to claim 1, wherein, when the predetermined type of encoded data of other macroblock lacks, the predetermined positions are positions relating to the predetermined type of encoded data utilized to reproduce the predetermined type of lacking encoded data.

7. An encoded data output method according to claim 1, wherein the predetermined type of encoded data includes at least a motion vector.

8. An encoded data output method according to claim 1, wherein:
    a predicting direction determination step is applied to determine whether or not a predicting direction applied to the respective submacroblocks included in the macroblocks, to which the predetermined prediction mode is applied, is bidirection; and
    the encoded data selection step is applied only to the submacroblocks, the predicting direction of which is determined to be non-bidirection at the predicting direction determination step.

9. An encoded data output method according to claim 1, wherein:
    a predicting direction determination step is applied to determine whether or not a predicting direction applied to the respective submacroblocks included in the macroblocks, to which the predetermined prediction mode is applied, is bidirection; and
    the encoded data selection step is applied to the submacroblocks, the predicting direction of which is determined to be non-bidirection at the predicting direction determination step, and the encoded data selection step is applied or not applied to the submacroblocks to which it is determined that the predicting direction thereof is bidirection at the predicting direction determination step.

10. An encoded data output method according to claim 1, wherein:
    a predicting direction determination step is applied to determine whether or not a predicting direction applied to the respective submacroblocks included in the macroblocks, to which the predetermined prediction mode is applied, is bidirection; and
    the encoded data selection step is applied to the macroblocks only when the number of the submacroblocks, which is included in the macroblocks to which the predetermined prediction mode is applied, and to which a bidirectional predicting direction is applied, is a predetermined value or less.

11. An encoded data output method according to claim 1, wherein the encoded data selection step selects a predetermined type of encoded data, which corresponds to secondary submacroblocks including the pixels at the predetermined positions in the macroblocks, in the macroblocks to which the predetermined prediction mode is applied.

12. An encoded data output method according to claim 1, wherein bits are not reduced as to encoded data of a type other than the predetermined type.

13. A recoded data creation method comprising: the respective steps of the encoded data output method according to claim 1;
a decode step for decoding a base band signal from an input bit stream; and
a multiplex step for multiplexing encoded data, which is obtained by applying the encoded data output method to the input bit stream, to the base band signal.

14. An encoded data restore method of restoring the encoded data of respective macroblocks for encoding based on the encoded data of respective macroblocks created by an encoded data output method of outputting encoded data of respective macroblocks corresponding to an input bit stream in a predetermined number of bits or less, the method comprising:
a prediction mode determination step for determining whether or not a prediction mode applied to the macroblocks is a predetermined prediction mode;
an encoded data selection determination step for determining, in the encoded data output method, that encoded data of a predetermined type corresponding to the pixels at the predetermined positions in the macroblocks is selected in the macroblocks to which the predetermined prediction mode is applied;
a bit distribution determination step for determining, in the encoded data output method, that bits, the number of which is already determined for each macroblock, are more preferentially distributed to a predetermined type of encoded data selected at the encoded data selection step than a predetermined type of encoded data that is not selected at the encoded data selection step in the macroblocks to which the predetermined prediction mode is applied; and
an encoded data restore step for restoring the encoded data of the respective macroblocks for recoding based on a result of the bit distribution determination step,
wherein the prediction mode determination step, the encoded data selection determination step, the bit distribution determination step, and the encoded data restore step are executed for each macroblock independently from macroblocks other than said each macroblock.

15. An encoded data restore method according to claim 14, wherein the bit distribution determination step determines that the predetermined type of encoded data, which is determined to be not selected in the encoded data output method at the encoded data selection determination step, is reduced in the encoded data output method.

16. An encoded data restore method according to claim 14, wherein the bit distribution determination step determines that bits, which are the same or less than the bits in the input bit stream, are distributed to or reduced from the predetermined type of encoded data which is determined to be selected in the encoded data output method at the encoded data selection determination step in the encoded data output method.

17. An encoded data restore method according to claim 14, wherein the predetermined prediction mode is a mode for further dividing the submacroblocks constituting each of the macroblocks to one or a plurality of secondary submacroblocks and arranging the secondary submacroblocks as motion compensation blocks.

18. An encoded data restore method according to claim 14, wherein the predetermined positions are four corners of the macroblocks.

19. An encoded data restore method according to claim 14, wherein when the predetermined type of coded data of other macroblock lacks, the predetermined positions are positions relating to the predetermined type of coded data utilized to reproduce the predetermined type of lacking coded data.

20. An encoded data restore method according to claim 14, wherein the predetermined type of coded data includes at least a motion vector.

21. An encoded data restore method according to claim 14 wherein:
a predicting direction determination step is applied to determine whether or not a predicting direction applied to the respective submacroblocks included in the macroblocks, to which the predetermined prediction mode is applied, is bidirection; and
the encoded data selection step is applied only to the submacroblocks, the predicting direction thereof of which is determined to be non-bidirection at the predicting direction determination step.

22. An encoded data restore method according to claim 14, wherein:
a predicting direction determination step is applied to determine whether or not a predicting direction applied to the respective submacroblocks included in the macroblocks, to which the predetermined prediction mode is applied, is bidirection; and
the encoded data selection step is applied to the submacroblocks, the predicting direction of which is determined to be non-bidirection at the predicting direction determination step, and the encoded data selection step is applied or not applied to the submacroblocks to which it is determined that the predicting direction thereof is bidirection at the predicting direction determination step.

23. An encoded data restore method according to claim 14, wherein:
a predicting direction determination step is applied to determine whether or not a predicting direction applied to the respective submacroblocks included in the macroblocks, to which the predetermined prediction mode is applied, is bidirection; and
the encoded data selection step is applied to the macroblocks only when the number of the submacroblocks, which is included in the macroblocks to which the predetermined prediction mode is applied, and to which a bidirectional predicting direction is applied, is a predetermined value or less.

24. An encoded data restore method according to claim 14, wherein, the encoded data selection step determines that a predetermined type of encoded data, which corresponds to secondary submacroblocks including the pixels at the predetermined positions in the macroblocks, is selected in the macroblocks to which the predetermined prediction mode is applied, in the encoded data output method.

25. An encoded data restore method according to claim 14, wherein, as to a type of encoded data other than the predetermined type, the encoded data is restored based on that bits are not reduced in the encoded data output method.

26. An encoding method comprising: the respective steps of the encoded data restore method according to claim 14; and an encode step for encoding an input base band signal making use of the encoded data restored by the encoded data restore method.

27. An encoded data output device for outputting encoded data of respective macroblocks corresponding to an input bit stream in a predetermined number of bits or less, comprising:

prediction mode determination means for determining whether or not a prediction mode applied to the macroblocks is a predetermined prediction mode;

encoded data selection means for selecting a predetermined type of encoded data corresponding to the pixels at predetermined positions in the macroblocks to which the predetermined prediction mode is applied; and bit distribution means for more preferentially distributing bits, the number of which is already determined for each macroblock, to a predetermined type of encoded data selected by the encoded data selection means than a predetermined type of encoded data that is not selected by the encoded data selection means in the macroblocks to which the predetermined prediction mode is applied, wherein the prediction mode determination means, the encoded data selection means, and the bit distribution means operate for each macroblock independently from macroblocks other than said each macroblock.

28. An encoded data output device according to claim 27, wherein the bit distribution means reduces the predetermined type of encoded data which is not selected at the encoded data selection means.

29. An encoded data output device according to claim 27, wherein the bit distribution means distributes bits as many as or less than the bits in the input bit stream to the predetermined type of encoded data selected by the encoded data selection means.

30. An encoded data output device according to claim 27, wherein the predetermined prediction mode is a mode for further dividing the submacroblocks constituting each of the macroblocks to one or a plurality of secondary submacroblocks and arranging the secondary submacroblocks as motion compensation blocks.

31. An encoded data output device according to claim 27, wherein the predetermined positions are four corners of the macroblocks.

32. An encoded data output device according to claim 27, wherein, when the predetermined type of encoded data of other macroblock lacks, the predetermined positions are positions relating to the predetermined type of encoded data utilized to reproduce the predetermined type of lacking encoded data.

33. An encoded data output device according to claim 27, wherein the predetermined type of encoded data includes at least a motion vector.

34. An encoded data output device according to claim 27, wherein:

predicting direction determination means is applied to determine whether or not a predicting direction applied to the respective submacroblocks included in the macroblocks, to which the predetermined prediction mode is applied, is bidirection; and the encoded data selection means is applied only to the submacroblocks, the predicting direction of which is determined to be non-bidirection by the prediction direction determination means.

35. An encoded data output device according to claim 27, wherein:

predicting direction determination means is applied to determine whether or not a predicting direction applied to the respective submacroblocks included in the macroblocks, to which the predetermined prediction mode is applied, is bidirection; and the encoded data selection means is applied to the submacroblocks, the predicting direction of which is determined to be non-bidirection at the predicting direction determination means, and the encoded data selection means is applied or not applied to the submacroblocks to which it is determined that the predicting direction thereof is bidirection at the predicting direction determination means.

36. An encoded data output device according to claim 27, wherein:

predicting direction determination means is applied to determine whether or not a predicting direction applied to the respective submacroblocks included in the macroblocks, to which the predetermined prediction mode is applied, is bidirection; and the encoded data selection means is applied to the macroblocks only when the number of the submacroblocks, which is included in the macroblocks to which the predetermined prediction mode is applied, and to which a bidirectional predicting direction is applied, is a predetermined value or less.

37. An encoded data output device according to claim 27, wherein the encoded data selection means selects a predetermined type of encoded data, which corresponds to secondary submacroblocks including the pixels at the predetermined positions in the macroblocks, in the macroblocks to which the predetermined prediction mode is applied.

38. An encoded data output device according to claim 27, wherein bits are not reduced as to encoded data of a type other than the predetermined type.

39. A recoded data creation device comprising: the respective means of the encoded data output device according to claim 27;

decode means for decoding a base band signal from an input bit stream; and multiplex means for multiplexing encoded data, which is obtained by applying the encoded data output device to the input bit stream, to the base band signal.

40. An encoded data restore device for restoring the encoded data of respective macroblocks for encoding based on the encoded data of respective macroblocks created by an encoded data output device for outputting encoded data of respective macroblocks corresponding to an input bit stream in a predetermined number of bits or less, the device comprising:

prediction mode determination means for determining whether or not a prediction mode applied to the macroblocks is a predetermined prediction mode;

encoded data selection determination means for determining, in the encoded data output device, that encoded data of a predetermined type corresponding to the pixels at the predetermined positions in the macroblocks is selected in the macroblocks to which the predetermined prediction mode is applied;

bit distribution determination means for determining, in the encoded data output device, that bits, the number of which is already determined for each macroblock, are more preferentially distributed to a predetermined type of encoded data selected at the encoded data selection means than a predetermined type of encoded data that is not selected at the encoded data selection means in the macroblocks to which the predetermined prediction mode is applied; and encoded data restore means for restoring the encoded data of the respective macroblocks for recoding based on a result of the bit distribution determination means, wherein the prediction mode determination means, the encoded data selection determination means, the bit distribution determination means, and the encoded data restore means operate for each macroblock independently from macroblocks other than said each macroblock.

41. An encoded data restore device according to claim 40, wherein the bit distribution determination means determines that the predetermined type of encoded data, which is determined to be not selected in the encoded data output device by the encoded data selection determination means, is reduced in the encoded data output device.

42. An encoded data restore device according to claim 40, wherein the bit distribution determination means determines that bits, which are the same or less than the bits in the input bit stream, are distributed to or reduced from the predetermined type of encoded data which is determined to be selected in the encoded data output device by the encoded data selection determination means in the encoded data output device.

43. An encoded data restore device according to claim 40, wherein the predetermined prediction mode is a mode for further dividing the submacroblocks constituting each of the macroblocks to one or a plurality of secondary submacroblocks and arranging the secondary submacroblocks as motion compensation blocks.

44. An encoded data restore device according to claim 40, wherein the predetermined positions are four corners of the macroblocks.

45. An encoded data restore device according to claim 40, wherein when the predetermined type of coded data of other macroblock lacks, the predetermined positions are positions relating to the predetermined type of coded data utilized to reproduce the predetermined type of lacking coded data.

46. An encoded data restore device according to claim 40, wherein the predetermined type of coded data includes at least a motion vector.

47. An encoded data restore device according to claim 40 wherein:
  predicting direction determination means is applied to determine whether or not a predicting direction applied to the respective submacroblocks included in the macroblocks, to which the predetermined prediction mode is applied, is bidirection; and
  the encoded data selection means is applied only to the submacroblocks, the predicting direction of which is determined to be non-bidirection at the predicting direction determination means.

48. An encoded data restore device according to claim 40, wherein:
  predicting direction determination means is applied to determine whether or not a predicting direction applied to the respective submacroblocks included in the macroblocks, to which the predetermined prediction mode is applied, is bidirection; and
  the encoded data selection means is applied to the submacroblocks, the predicting direction of which is determined to be non-bidirection by the prediction direction determination means, and the encoded data selection means is applied or not applied to the submacroblocks to which it is determined by the predicting direction determination means that the predicting direction thereof is bidirection.

49. An encoded data restore device according to claim 40, wherein:
  predicting direction determination means is applied to determine whether or not a predicting direction applied to the respective submacroblocks included in the macroblocks, to which the predetermined prediction mode is applied, is bidirection; and
  the encoded data selection means is applied to the macroblocks only when the number of the submacroblocks, which is included in the macroblocks to which the predetermined prediction mode is applied, and to which a bidirectional predicting direction is applied, is a predetermined value or less.

50. An encoded data restore device according to claim 40, wherein the encoded data selection means determines that a predetermined type of encoded data, which corresponds to secondary submacroblocks including the pixels at the predetermined positions in the macroblocks, is selected in the macroblocks to which the predetermined prediction mode is applied, in the encoded data output device.

51. An encoded data restore device according to claim 40, wherein, as to a type of encoded data other than the predetermined type, the encoded data is restored based on that bits are not reduced in the encoded data output device.

52. An encoding device comprising: the respective means of the encoded data restore device according to claim 40; and an encode means for encoding an input base band signal making use of the encoded data restored by the encoded data restore device.

53. A non-transitory computer readable medium, on which a program is recorded, said program, when executed, causes a computer to perform an encoded data output method of outputting encoded data of respective macroblocks corresponding to an input bit stream in a predetermined number of bits or less, said method comprising:
  a prediction mode determination step for determining whether or not a prediction mode applied to the macroblocks is a predetermined prediction mode;
  an encoded data selection step for selecting a predetermined type of encoded data corresponding to the pixels at predetermined positions in the macroblocks to which the predetermined prediction mode is applied; and
  a bit distribution step for more preferentially distributing bits, the number of which is already determined for each macroblock, to a predetermined type of encoded data selected at the encoded data selection step than a predetermined type of encoded data that is not selected at the encoded data selection step in the macroblocks to which the predetermined prediction mode is applied,
  wherein the prediction mode determination step, the encoded data selection step, and the bit distribution step are executed for each macroblock independently from macroblocks other than said each macroblock.

54. A non-transitory computer readable medium, on which a program is recorded, said program, when executed, causes a computer to perform an encoded data restore method of restoring the encoded data of respective macroblocks for encoding based on the encoded data of respective macroblocks created by an encoded data output method of outputting encoded data of respective macroblocks corresponding to an input bit stream in a predetermined number of bits or less, said method comprising:
  a prediction mode determination step for determining whether or not a prediction mode applied to the macroblocks is a predetermined prediction mode;
  an encoded data selection determination step for determining, in the encoded data output method, that encoded data of a predetermined type corresponding to the pixels at the predetermined positions in the macroblocks is selected in the macroblocks to which the predetermined prediction mode is applied;
  a bit distribution determination step for determining, in the encoded data output method, that bits, the number of which is already determined for each macroblock, are more preferentially distributed to a predetermined type of encoded data selected at the encoded data selection step than a predetermined type of encoded data that is not selected at the encoded data selection step in the macroblocks to which the predetermined prediction mode is applied; and an encoded data restore step for restoring the encoded data of the respective macroblocks for recoding based on a result of the bit distribution determination step, wherein the prediction mode determination step, the encoded data selection determination step, the bit distribution determination step, and the encoded data restore step are executed for each macroblock independently from macroblocks other than said each macroblock.

* * * * *